(12) United States Patent
Godala et al.

(10) Patent No.: US 11,019,575 B2
(45) Date of Patent: May 25, 2021

(54) METHODS AND SYSTEMS FOR CONTROLLING TRANSMISSION POWER OF USER EQUIPMENT IN MM WAVE WIRELESS NETWORKS

(71) Applicant: SAMSUNG ELECTRONICS CO., LTD., Suwon-si (KR)

(72) Inventors: Anirudh Reddy Godala, Bangalore (IN); Ashok Kumar Reddy Chavva, Bangalore (IN); Anusha Gunturu, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/793,724

(22) Filed: Feb. 18, 2020

(65) Prior Publication Data

US 2020/0267662 A1 Aug. 20, 2020

(30) Foreign Application Priority Data

Feb. 18, 2019 (IN) .............................. 201941006320
Apr. 26, 2019 (IN) .............................. 201941016638
Feb. 7, 2020 (IN) .............................. 201941006320

(51) Int. Cl.
*H04W 52/24* (2009.01)
*H04L 1/18* (2006.01)
(Continued)

(52) U.S. Cl.
CPC ......... *H04W 52/241* (2013.01); *H04L 1/0001* (2013.01); *H04L 1/0047* (2013.01);
(Continued)

(58) Field of Classification Search
CPC ........... H04W 52/00–60; H04W 24/00; H04W 24/02; H04W 52/241; H04W 52/365;
(Continued)

(56) References Cited

U.S. PATENT DOCUMENTS 9,603,105 B2 3/2017 Yun
10,291,309 B2 5/2019 Chakraborty et al.
(Continued)

FOREIGN PATENT DOCUMENTS

KR 10-2018-0136433 A 12/2018
WO 2017196612 A1 11/2017
WO 2018231755 A1 12/2018

OTHER PUBLICATIONS

International Search Report (PCT/ISA/210) dated May 21, 2020, issued by the International Searching Authority in counterpart International Application No. PCT/KR2020/002336.
(Continued)

*Primary Examiner* — Raymond S Dean
(74) *Attorney, Agent, or Firm* — Sughrue Mion, PLLC

(57) ABSTRACT

A communication method and system for converging a 5th-Generation (5G) communication system for supporting higher data rates beyond a 4th-Generation (4G) system with a technology for Internet of Things (IoT), which may be applied to intelligent services based on the 5G communication technology and IoT-related technology, such as smart home, smart building, smart city, smart car, connected car, health care, digital education, smart retail, security and safety services. The methods and systems control transmission power of User Equipment (UE) based on user interactions. The methods and systems include detecting user interactions with transmitted signals of the UE using information collected from at least one sensor, and using the information collected from the at least one sensor to estimate the transmission power of the UE for compliance with regulatory organization limits for user exposer to signals.

20 Claims, 23 Drawing Sheets

(51) Int. Cl.
    *H04W 52/36*     (2009.01)
    *H04L 1/00*     (2006.01)

(52) U.S. Cl.
    CPC ......... *H04L 1/1812* (2013.01); *H04W 52/365* (2013.01); *H04W 52/367* (2013.01)

(58) Field of Classification Search
    CPC .... H04W 52/367; H04B 17/00; H04L 1/0001; H04L 1/0047; H04L 1/1812
    See application file for complete search history.

(56) References Cited

U.S. PATENT DOCUMENTS

| | | | |
|---|---|---|---|
| 2013/0310109 A1 | 11/2013 | Filipovic et al. | |
| 2018/0084600 A1 | 3/2018 | Prasad et al. | |
| 2018/0227899 A1* | 8/2018 | Yu | H04B 7/02 |
| 2018/0278318 A1 | 9/2018 | Chakraborty et al. | |
| 2019/0159143 A1 | 5/2019 | Li et al. | |
| 2019/0166555 A1* | 5/2019 | Cheng | H04B 1/74 |
| 2019/0182880 A1* | 6/2019 | Yang | H04L 5/0073 |
| 2019/0200365 A1* | 6/2019 | Sampath | H04B 1/3838 |
| 2020/0037254 A1* | 1/2020 | Comsa | H04W 52/265 |
| 2020/0145079 A1* | 5/2020 | Marinier | H04W 74/0833 |
| 2020/0163023 A1 | 5/2020 | Pelletier et al. | |
| 2020/0413395 A1* | 12/2020 | Chen | H04W 74/00 |

OTHER PUBLICATIONS

Written Opinion (PCT/ISA/237) dated May 21, 2020, issued by the International Searching Authority in counterpart International Application No. PCT/KR2020/002336.

Bjorn Thors et al.; "On the Estimation of SAR and Compliance Distance Related to RF Exposure From Mobile Communication Base Station Antennas", IEEE Transactions on Electromagnetic Compatibility, vol. 50, No. 4, Nov. 2008, pp. 837-848 (Total 12 pages).

David L. Means and Kwok W. Chan; "Evaluating Compliance with FCC Guidelines for Human Exposure to Radiofrequency Electromagnetic Fields", Federal Communications Commission Office of Engineering & Technology, Jun. 2001, Total 57 pages.

Ting Wu, et al.; "The Human Body and Millimeter-Wave Wireless Communication Systems: Interactions and Implications", accepted in 2015 IEEE International Conference on Communications (ICC), Jun. 2015, Total 7 pages.

D. Colombi, et al.; "Implications of EMF Exposure Limits on Output Power Levels for 5G Devices Above 6 GHz", IEEE Antennas and Wireless Propagation Letters, vol. 14, 2015, pp. 1247-1249 (Total 3 pages).

Jeffrey A. Nanzer and Robert L. Rogers; "Human Presence Detection Using Millimeter-Wave Radiometry", IEEE Transactions on Microwave Theory and Techniques, vol. 55, No. 12, Dec. 2007, pp. 2727-2733 (Total 7 pages).

"People counting demonstration using TI mmWave sensors", Texas Instruments, mmWave Radar Demonstrations, Dec. 19, 2017, Total 1 page, Video Link: https://training.ti.com/people-counting-demonstration-using-ti-mmwave-sensors).

"AK9750 Human Detection IR Sensor Module", Asahi Kasei Microdevices Corporation, Mar. 3, 2017, Total 2 pages, URL: https://www.digikey.in/en/product-highlight/a/akm-semi/ak9750-human-detection-ir-sensor-module.

"RF Exposure: Order/NPRM Issues", Technical Analysis Branch, Office of Engineering and Technology, Federal Communications Commission, TCB Workshop, Oct. 2018, Total 17 pages, URL: https://transition.fcc.gov/oet/ea/presentations/files/oct18/5.1-TCB-RF-Exposure-OrderNPRM-Issues-MD.PDF.

"Guidelines for Limiting Exposure to Time-Varying Electric, Magnetic and Electromagnetic Fields (100 kHz to 300 GHz)", International Commission on Non-Ionizing Radiation Protection, Jul. 11, 2018, Total 3 pages, URL: https://www.icnirp.org/cms/upload/consultation_upload/ICNIRP_RF_Guidelines_PCD_2018_07_11.pdf.

Communication dated Apr. 6, 2021, issued by the India Intellectual Property Office in Indian Patent Application No. 201941006320.

\* cited by examiner

FIG. 5B

Example Power Thresholds (mW)

| Frequency (GHz) | Distance (cm) | | | | | | | | | | | | |
|---|---|---|---|---|---|---|---|---|---|---|---|---|---|
| | 0.5 | 1 | 1.5 | 2 | 2.5 | 5 | 7 | 10 | 12.5 | 15 | 17.5 | 20 | 40 |
| 0.3 | 39 | 65 | 88 | 110 | 130 | 220 | 200 | 360 | 430 | 490 | 550 | 810 | 810 |
| 0.45 | 22 | 44 | 67 | 89 | 110 | 230 | 320 | 460 | 570 | 690 | 800 | 920 | 920 |
| 0.835 | 9.2 | 25 | 44 | 66 | 98 | 240 | 380 | 640 | 880 | 1100 | 1400 | 1700 | 1700 |
| 0.9 | 8.3 | 23 | 42 | 63 | 88 | 240 | 400 | 670 | 920 | 1200 | 1500 | 1800 | 1800 |
| 1.45 | 4.3 | 15 | 30 | 50 | 74 | 250 | 460 | 870 | 1300 | 1800 | 2300 | 3000 | 3000 |
| 1.8 | 3.5 | 13 | 26 | 45 | 67 | 240 | 450 | 880 | 1300 | 1800 | 2400 | 3000 | 3000 |
| 1.9 | 3.4 | 12 | 26 | 44 | 66 | 240 | 440 | 850 | 1300 | 1800 | 2400 | 3000 | 3000 |
| 2.45 | 2.7 | 10 | 22 | 38 | 59 | 220 | 420 | 820 | 1200 | 1800 | 2400 | 3000 | 3000 |
| 3 | 2.3 | 9.0 | 20 | 35 | 53 | 210 | 400 | 730 | 1200 | 1700 | 2400 | 3000 | 3000 |
| 5.2 | 1.5 | 6.3 | 15 | 26 | 42 | 170 | 360 | 730 | 1200 | 1700 | 2300 | 3000 | 3000 |
| 5.8 | 1.4 | 5.9 | 14 | 25 | 40 | 170 | 340 | 720 | 1100 | 1700 | 2300 | 3000 | 3000 |

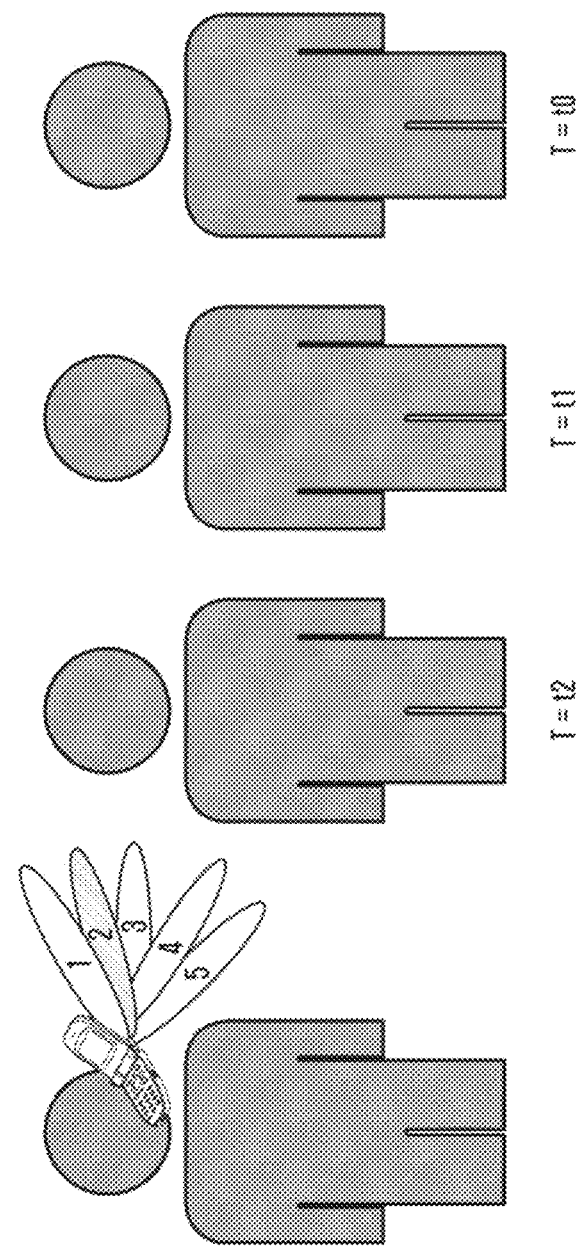

(a) Parallel polarization (b) Perpendicular polarization

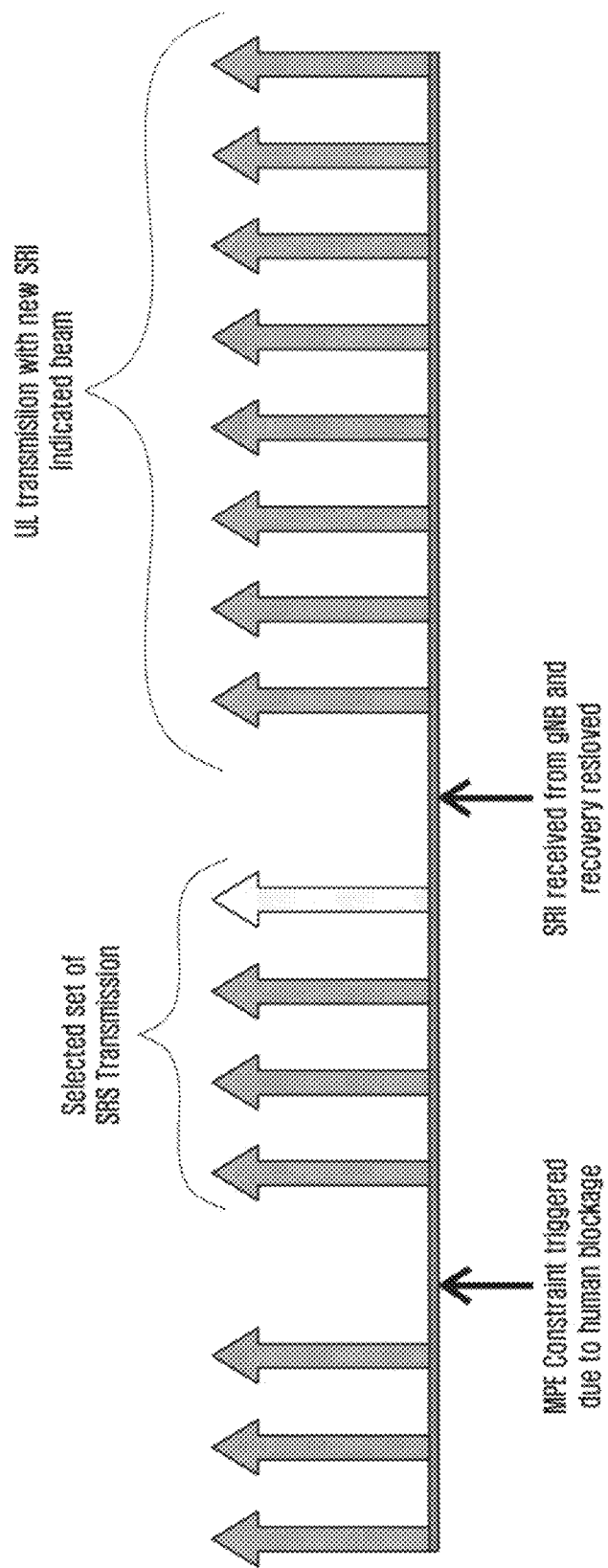

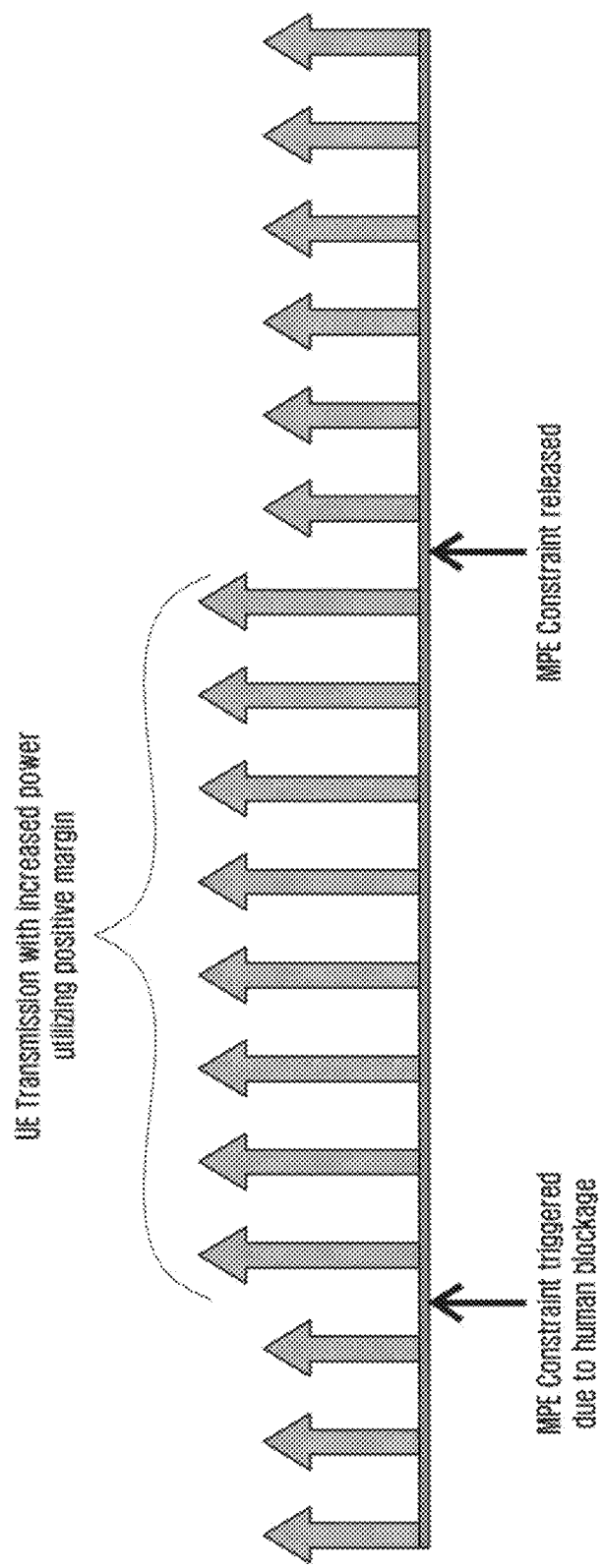

METHODS AND SYSTEMS FOR CONTROLLING TRANSMISSION POWER OF USER EQUIPMENT IN MM WAVE WIRELESS NETWORKS

CROSS-REFERENCE TO RELATED APPLICATION(S)

This application claims priority from Indian Provisional Patent Application No. 201941006320 filed on Feb. 18, 2019, in the Indian Patent Office, Indian Provisional Patent Application No. 201941016638 filed on Apr. 26, 2019, in the Indian Patent Office, and Indian Non-Provisional Patent Application No. 201941006320 filed on Feb. 7, 2020, in the Indian Patent Office, the entire disclosures of which are hereby incorporated by reference.

FIELD

The disclosure relates to wireless communication networks, and more particularly to adaptively controlling the transmission power of a User Equipment (UE) based on user interactions in beam formed millimeter wave (mmWave) wireless networks.

DESCRIPTION OF RELATED ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In case of beam forming systems, such as New Radio (NR) at mmWave, users are exposed to higher radiation compared to other technologies due to directionality of the transmit signal and the increased power of the transmit signal. Federal Communications Commission (FCC) and International Commission on Non-Ionizing Radiation Protection (ICNIRP) have defined maximum permissible exposure (MPE) for mmWave bands (FR2). Adhering to these limits is not trivial given the complexity of the technology and regulations.

For example, a User Equipment (UE) may be transmitting uplink signals with 20 dBm power and a user may be at a distance of ten centimeters from the UE. Based on regulated frequency thresholds (depending on regulatory commission, such as 10 GHz or 6 GHz), the exposure to the user may be measured in terms of power density, as illustrated using the below Equation:

$$\text{Powerdensity} = \text{Powertransmitted} * \text{antennagain} / 4\pi \text{distance}^2$$

Thus, by way of example, an antenna gain of the UE may be 17 dB, and the power density is 39.88 W/m2. The FCC and ICNIRP defined exposure limit are 10 W/m2, which means that the exposure due to the transmission is nearly 4 times the regulatory limit. However, this example only considers an exposure caused by NR. In dual transmission scenarios, an effect of both Long Term Evolution (LTE) and NR on a human body further increases the exposure of the user and exacerbates the overexposure problem when compared to a single transmission. Accordingly, there is an important need to appropriately control the transmission power of a UE in consideration of health of a user given the exposure of the user to signals transmitted by and received by the UE.

SUMMARY

Aspects of the disclosure relate to methods and systems for adaptively controlling transmission power of a User Equipment (UE) in beam forming millimeter wave (mmWave) wireless networks.

Aspects of the disclosure relate to methods and systems for detecting user interactions with signals transmitted by the UE using at least one sensor.

Aspects of the disclosure relate to methods and systems for calculating a maximum transmission power of the UE based on detected user interactions.

Aspects of the disclosure relate to methods and systems for estimating the transmission power of the UE to perform uplink transmission, by checking if the calculated maximum transmission power of the UE satisfies a particular transmission power limit, such as one or more regulatory limits.

The embodiments herein provide methods and systems for controlling transmission power of a User Equipment (UE) in a beam-based communication based on human interaction. According to an aspect of an embodiment, there is provided a method of controlling transmission power of a User Equipment (UE) in a Beam-based Communication based on human interaction, the method including detecting, by a processor, a blockage of at least one serving beam of the UE by at least one user, estimating, by the processor, a maximum transmission power of the UE for an uplink (UL) transmission based on the blockage, and determining, by the processor, an UL transmission power based on the estimated maximum transmission power of the UE.

According to an aspect of an embodiment, there is provided a User Equipment (UE) in a wireless communication network including a memory and a processor coupled to the memory. The processor is configured to detect a blockage of at least one serving beam by at least one user. The processor is further configured to estimate a maximum transmission power of the UE for an uplink (UL) transmission based on the blockage. The processor is further configured to determine an UL transmission power based on the estimated maximum transmission power of the UE.

These and other aspects of the embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF FIGURES

Embodiments herein are described with reference to the accompanying drawings, throughout which like reference letters indicate corresponding parts in the various figures. The embodiments herein will be better understood from the following description with reference to the drawings, in which:

FIGS. 3A, 3B, 3C, and 3D are diagrams illustrating example scenarios in which at least one user has interactions with a serving beam of the antenna, according to an embodiment;

FIG. 5B is a table illustrating the interpolation of experimental data to calculate Specific Absorption Rate (SAR), according to an embodiment;

FIG. 8C is a diagram illustrating prediction of the SRS port and the power headroom, according to an embodiment;

FIGS. 11A, 11B, 11C, 11D, 11E, and 11F are diagrams illustrating transmissions of the UE with the transmission power that meets the regulatory limits, according to an embodiment.

DETAILED DESCRIPTION OF THE EMBODIMENTS

Figure 1:
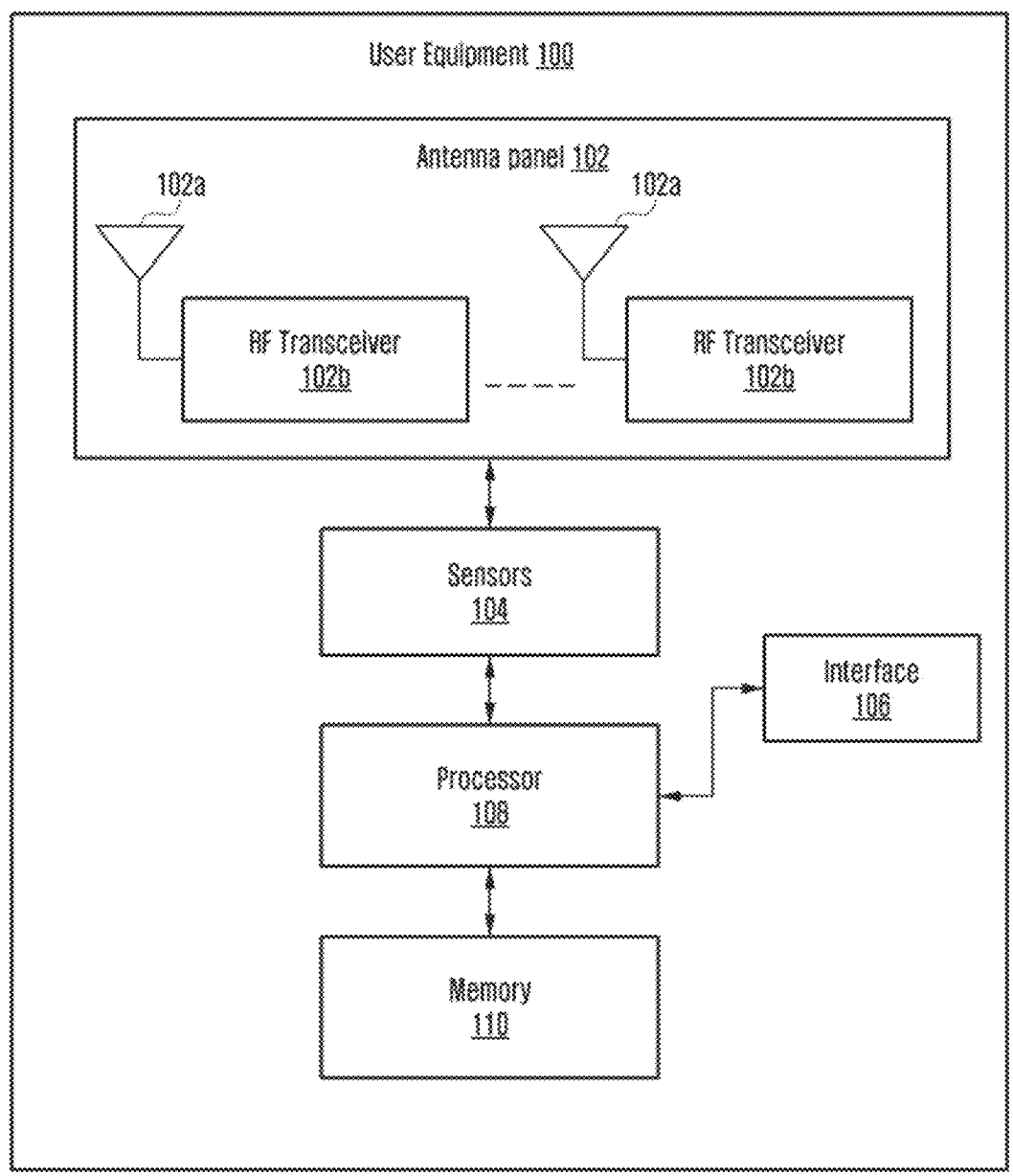
FIG. 1 is a block diagram illustrating a User Equipment (UE), according to an embodiment.

The embodiments herein and the various features and advantageous details thereof are explained more fully with reference to the the accompanying drawings and detailed in the following description. Descriptions of well-known components and processing techniques are omitted to not unnecessarily obscure the embodiments herein. The description herein is intended to facilitate an understanding of ways in which the embodiments can be practiced and to further enable those of skill in the art to practice the embodiments. Accordingly, this disclosure should not be construed as limiting the scope of the example embodiments.

Embodiments herein relate to methods and systems for adaptively changing transmission power of a User Equipment (UE) in beam formed millimeter wave (mmWave) wireless networks, based on user interactions following compliance with regulatory body exposure conditions.

Embodiments herein relate to methods and systems for detecting user interactions with transmitted signals of the UE using information collected from at least one sensor, and using the information collected from the at least one sensor to estimate the transmission power of the UE, so that regulatory organization limits may be satisfied.

Referring now to the drawings, and more particularly to FIGS. 1 through 12, where similar reference characters denote corresponding features consistently throughout the figures, there are shown example embodiments.

FIG. 1 is a block diagram illustrating a User Equipment (UE) 100, according to an embodiment. Examples of the UE 100 can be, but are not limited to, a mobile phone, a smartphone, a tablet, a phablet, a personal digital assistant (PDA), a laptop, a computer, a wearable computing device, a vehicle infotainment device, an Internet of Things (IoT) device, a Virtual Reality (VR) device, a Wireless Fidelity (Wi-Fi) router, a Universal Serial Bus (USB) dongle, or any other processing devices capable of using a wireless communication network. The wireless communication network referenced herein can be a beam forming millimeter wave (mmWave) network such as, for example, a Long Term Evolution (LTE) network, a New Radio (NR/5G network), and so on. In an embodiment, the UE 100 can support 5G transmission and reception, and can support all aspects of LTE. In an embodiment, the UE 100 can support dual connectivity by supporting both LTE and 5G networks. The UE 100 can be connected with at least one Base Station (BS) over an air interface. In an embodiment herein, the BS can be an eNodeB (eNB) in case of a LTE network or the BS can be a gNodeB (gNB) in case of a 5G network.

The UE 100 can be configured to perform an uplink (UL) transmission (by transmitting Radio Frequency (RF) signals to the at least one BS) with a power that is determined based on user interactions, such that regulatory limits for user exposure to signals are satisfied. In an example herein, the regulatory limits can be set by a regulatory organization (for example, Federal Communications Commission (FCC), International Commission on Non-Ionizing Radiation Protection (ICNIRP)). The regulatory limits may indicate parameters such as Specific Absorption Rate (SAR) requirements, Maximum Permissible Exposure (MPE) requirements, a link budget, and so on.

The SAR can be a rate at which RF electromagnetic field energy is absorbed by a body of a user of the UE. The SAR can be applicable for frequencies less than 6 Hz (FCC) and for frequencies less than 10 GHz (ICNIRP). The SAR requirement can be represented using the below Equation:

$$\sum_{100\,KHz}^{f} \left( \frac{SAR_i}{SAR_{limit}} \right) \leq 1 \qquad \text{Equation (1)}$$

The MPE can be the power density averaged over a defined area and time averaged over a frequency dependent window to prevent an exposure hazard to a user represented by a tissue temperature change. The MPE limit can be applicable for the frequencies greater than 6 GHz. The MPE requirement can be represented using the below Equation:

$$\sum_{100\,KHz}^{f} \left( \frac{SAR_i}{SAR_{limit}} \right) + \sum_{f}^{300\,GHz} \left( \frac{PD_i}{PD_{limit}} \right) \leq K \qquad \text{Equation (2)}$$

wherein, 'PA' represents the power density and 'K' may be equal to 1.

For an Inter-band Evolved-Universal Terrestrial Radio Access-New Radio-Dual Connectivity (ENDC) within an FR1 band, the UE 100 should satisfy the SAR requirements. For the Inter-band ENDC including an FR2 band, the UE 100 should satisfy both the SAR and the MPE requirements.

The UE 100 may include an antenna panel 102, sensors 104, an interface 106, a processor 108 and a memory 110.

The antenna panel 102 includes a plurality of antennas 102a and a plurality of Radio Frequency (RF) transceivers 102b. The antenna 102a can be configured to receive RF signals from the at least one BS during a downlink (DL) transmission and to provide the received RF signals to the RF transceiver 102b. The antenna 102a can be further configured to transmit the RF signal received from the RF transceiver 102b to the at least one BS.

The RF transceiver 102b can be configured to receive the RF signals from the antenna 102a that are received from the at least one BS and process the received signals using a receiver processing circuitry. The RF transceiver 104 further provides the processed received signals to the processor 108. The RF transceiver 102b can be further configured to generate baseband/Intermediate Frequency (IF) signals using a transmitter processing circuitry on receiving data from the processor 108 and convert the generated signals to the RF signals. The RF transceiver 102b provides the RF signals to the antenna 102a for transmission to the at least one BS during the UL transmission.

The sensors 104 can be coupled to the antenna panel 102. Examples of the sensors 104 can be, but are not limited to cameras, proximity sensors, depth sensors, grip or pressure sensors, Infrared sensors, human detection sensors, and so on. The sensors 104 can be configured to capture information and data related to at least one user. The information can be at least one of presence of the at least one user, position and distance of the at least one user from the antenna 102a, and so on. The information captured by the sensors 104 can be provided to the processor 108.

The processor 108 can be at least one of a single processor, a plurality of processors, multiple homogenous cores, multiple heterogeneous cores, multiple Central Processing Unit (CPUs) of different kinds, and so on. The processor 108 may support beam forming or directional routing operations in which outgoing RF signals from the antennas 102a are weighted differently (assigning indices to each beam) to effectively steer the outgoing RF signals in a desired direction.

Figure 7:
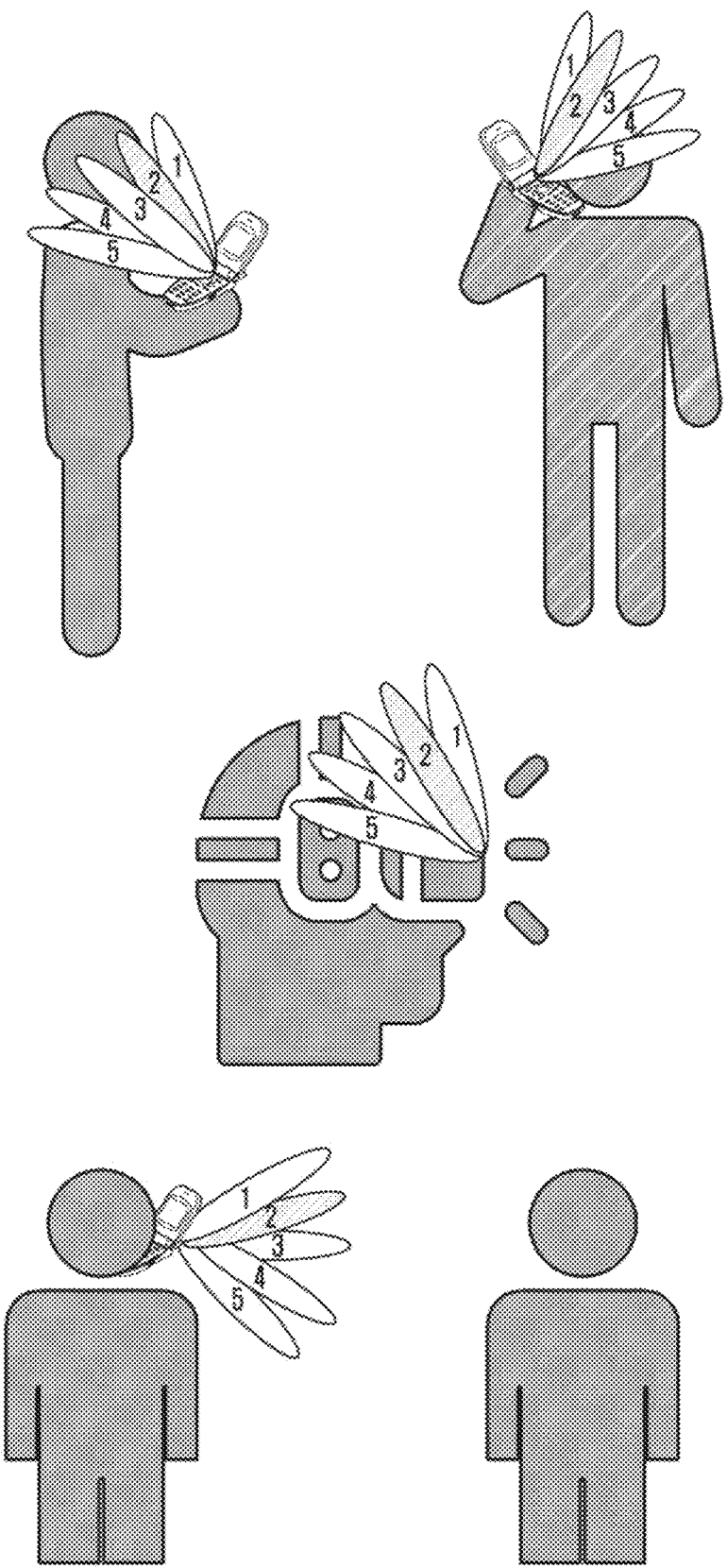
FIG. 7 is a diagram illustrating adaptive calculation of the transmission power of the UE, according to an embodiment.

The processor 108 can be configured to adaptively control the transmission power of the UE 100 by following regulatory exposure conditions during the UL transmission. Embodiments herein employ the terms "power," "transmission power," "transmission signal power," "transmit signal power," "uplink transmit power," "uplink transmission power" and so on interchangeably and refer to power that is required by the UE 100 to perform the UL transmission. In an embodiment, the processor 108 determines user interactions (examples of the user interactions are illustrated in FIG. 7) with at least one serving beam of the antenna 102a based on the information received from the sensors 104. The processor 108 uses the information received from the sensors 104 to estimate the transmission power of the UE to perform the UL transmission to satisfy the regulatory limits.

The interface 106 can be configured to enable the UE to communicate with at least one external entity (the at least one BS or the like).

The memory 110 can be configured to store data reflecting the regulatory limits defined by the regulatory organizations, the transmission power of the UE, the information collected from the sensors 104, and so on. The memory 110 may include one or more computer-readable storage media. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered as a non-transitory storage medium. The term "non-transitory" may indicate that the storage medium is not embodied in a carrier wave or a propagated signal. However, the term "non-transitory" should not be interpreted to mean that the memory 110 is immobile. In certain examples, a non-transitory storage medium may store data that can, over time, change (e.g., in Random Access Memory (RAM) or cache).

FIG. 1 shows exemplary components of the UE 100, but the configuration of the UE is not limited to the configuration illustrated in FIG. 1. The UE 100 may include fewer or additional components. Further, the labels or names of the components are used only for illustrative purpose and do not limit the scope of the embodiments herein. One or more components can be combined together to perform same or substantially similar function in the UE.

Figure 2:
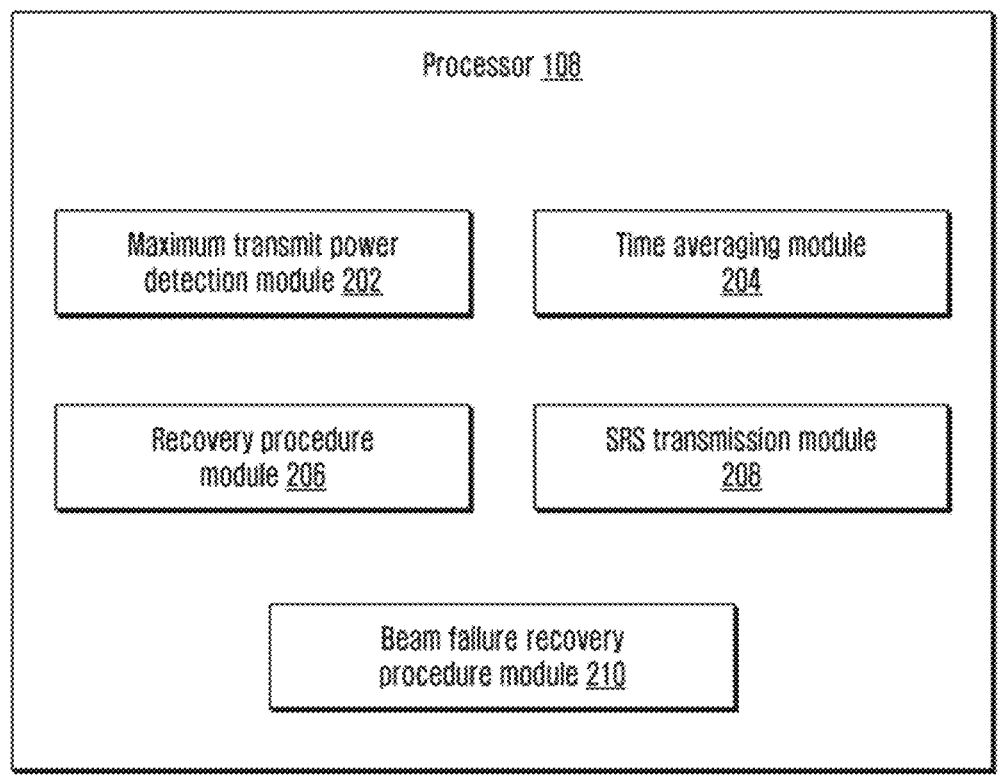
FIG. 2 is a block diagram illustrating various aspects of a processor of the UE, according to an embodiment.

FIG. 2 is a block diagram illustrating various aspects of the processor 108, according to an embodiment. The modules illustrated in FIG. 2 may be embodied as software executed by the processor 108 when executing computer-readable instructions stored in and loaded from the memory 110. Thus, the processor 108 may be configured to execute control of the functions of the modules herein. Of course, the modules may be implemented by a combination of hardware circuitry for performing one or more functions of the modules in combination with control effected by the processor when executing computer-readable instructions of the memory 110. The processor 108 includes a maximum transmission power detection module 202, a time averaging module 204, a recovery procedure module 206, a Sounding Reference Signal (SRS) transmission module 208, and a beam failure recovery procedure module 210.

The maximum transmission power detection module 202 can be configured to detect the maximum transmission power of the UE 100 based on at least one of the presence of the at least one user, the distance and position of the at least one user from the serving beam of the antenna 102a, and so on.

For determining the maximum transmission power of the UE 100, the maximum transmission power detection module 202 initially determines transmitter power requirements of the NR/NR power ($P_{NR}$) and transmitter power requirements of the LTE/LTE power ($P_{LTE}$). The maximum transmission power detection module 202 can determine the NR power and the LTE power as defined in clause 6.2B.1.3 or clause 6.2B.1.4 of 3GPP TS 38.101-3 according to the mode of operation of the UE 100. The mode of operation includes at least one of, but is not limited to, an inter-band Evolved-Universal Terrestrial Radio Access-New Radio-Dual Connectivity (ENDC) within an FR1 band, an inter-band ENDC including an FR2 band, an inter-band ENDC including both the FR1 and FR2 bands, an intra-band contiguous ENDC, an intra-band non-contiguous EN-DC, an Inter-band New Radio Dual between the FR1 and FR2 bands, and so on.

Further, the maximum transmission power detection module 202 receives the information from the sensors 104 coupled to the antenna panel 102. The information can be at least one of the presence of the at least one user, and positions and distances of the at least one user from the antenna panel 102. The maximum transmission power detection module 202 may also process the information received from the sensors 104 to determine the position and distance of the at least one user from the antenna panel 102. The information may be processed by applying at least one technique such as, but not limited to, an image processing, an image classification, or the like on the information received from the sensors 104. The maximum transmission power detection module 202 also determines antenna related information such as orientation of the serving beam of the antenna 102a, serving beam gain pattern/antenna gain at a given location. In an example herein, the beam directions/orientations of the serving beam, and the beam patterns/gain may be determined for the given UE 100 using a beam book (coefficients) and module placement information.

Based on the information received from the sensors 104 and/or the processed sensor information and the antenna related information, the maximum transmission power detection module 202 creates a virtual beam pattern to detect the user interactions with the at least one serving beam of the antenna 102a in its direction of departure. The maximum transmission power detection module 202 may use the available beam pattern and the device/UE orientation to find beam gain in that direction given the user's interactions with respect to the UE 100. If no user is detected interacting with the serving beam, the maximum transmission power detection module 202 calculates the SAR with a distance, which is considered as a maximum detection range of the sensors 104. If the at least one user has interaction with the serving beam of the antenna 102a, the maximum transmission power detection module 202 identifies the antenna gain (G (r, θ)) from a pattern of the serving beam and the position of the at least one user from the serving beam of the antenna 102a. The maximum transmission power detection module 202 may use the available beam pattern and the device/UE orientation to determine beam gain in that direction given the user's interactions with respect to the UE 100. Thereafter, the maximum transmission power detection module 202 calculates the SAR with a distance, which is considered as a defined minimum value of the range of the sensors 104, in which the user interaction is detected.

The maximum transmission power detection module 202 may calculate the SAR (for example; for the transmitted $P_{LTE}$.) using the below Equation:

$$SAR_{wb}\left(r, P, \phi, r_{wb}^l, r_{wb}^n\right) = \begin{cases} \tilde{C}P, & r < r_{wb}^l \\ \tilde{D}\dfrac{P}{\phi r}, & r_{wb}^l \le r \le r_{wb}^n \\ \tilde{D}\dfrac{Pr_{wb}^n}{\phi r^2}, & r > r_{wb}^n \end{cases} \quad \text{Equation (3)}$$

wherein, $\tilde{C} = \dfrac{1}{75}$ kg$^{-1}$, $\tilde{D} = \dfrac{1}{200}$ m·kg$^{-1}$ $$r_{wb}^l = \dfrac{\tilde{D}}{\tilde{C}\phi}$$

$$r_{wb}^n = \begin{cases} \tilde{E}\dfrac{D_0\phi}{\pi f}, & 800 \text{ MHz} \le f < 2000 \text{ MHz} \\ \tilde{F}\dfrac{D_0\phi}{\pi f}, & 2000 \text{ MHz} \le f \le 2200 \text{ MHz} \end{cases}$$

$$\tilde{E} = 8 \times 10^8 \text{ m.s}^{-1}$$

$$\tilde{F} = \dfrac{2}{5} \text{ m}$$

wherein, $\phi$ indicates horizontal half-power beam width, P indicates $P_{LTE}$. and 'r' indicates a distance. A value of 'r' can be the maximum detection range of the sensors 104 and/or techniques/methods used to process the information received from the sensors 104 when no user interaction is detected. The value of 'r' can be minimum value of the range of the sensors 104 in which the user interaction is detected. The SAR can be calculated using the Equation (3) for 2.2G Hz to 6 Hz operating bands.

The maximum transmission power detection module 202 may also calculate the SAR using interpolation of experimental data (an example table including the interpolation of experimental data is illustrated in FIG. 5B). The maximum transmission power detection module 202 may use the experimental data to generate an Equation of power threshold function in terms of frequency (f), distance (r) such as:

Power=function$_1(f,r)$      Equation (4)

The maximum transmission power detection module 202 may use the Equation (4) to calculate the SAR using the power threshold function. The SAR may be calculated as:

SAR=function_2(P,r,r)=(SAR$_{limit}$*P/function_(f,r))  Equation (5)

Once the SAR is calculated, the maximum transmission power detection module 202 determines maximum permissible exposure that can be radiated by the UE (SAR$_{max}$) in compliance with the regulatory limits. The maximum transmission power detection module 202 determines the SAR$_{max}$ for the Inter-band ENDC within the FR1 band using the below Equation:

$$SAR_{max} = SARl_{imit} * \left(1 - \sum_{100\,kHz}^{f}\left(\frac{SAR_i}{SAR_{limit}}\right)\right)$$ Equation (6)

wherein, only Master Cell Group (MCG) frequencies may be considered in $$\left(1 - \sum_{100\,KHz}^{f}\left(\frac{SAR_i}{SAR_{limit}}\right)\right).$$

After calculating the SAR$_{max}$, the maximum transmission power detection module 202 determines maximum permissible power density of the UE (PD$_{max}$) for the inter-band ENDC including the FR2 band using the below Equation:

$$PD_{max} = PD_{limit} * \left(1 - \sum_{100\,KHz}^{f}\left(\frac{SAR_i}{SAR_{limit}}\right)\right)$$ Equation (7)

Once the SAR$_{max}$ and the PD$_{max}$ are calculated, the maximum transmission power detection module 202 calculates the maximum transmission power of the UE for Secondary Cell Group (SCG) frequencies.

For the Inter-band ENDC within the FR1 band, the maximum transmission power detection module 202 determines the maximum transmission power limit of the UE (P$_{MAX\_NR\_limit}$) using the Equation (3), which is used for calculating the SAR.

Thereafter, the maximum transmission power detection module 202 determines the maximum transmission power of the UE 100 (can be a maximum NR power of the UE 100 (P$_{MAX\_NR}$)) using the below Equation:

$$P_{MAX\_NR} = \min(P_{MAX\_NR\_limit}, P_{CMAX} - P_{LTE})$$ Equation (8)

wherein, P$_{CMAX}$ indicates a maximum output power of a UE power class.

For the Inter-band ENDC including the FR2 band, the maximum transmission power detection module 202 determines the maximum transmission power of the UE 100 (P$_{MAX\_NR}$) based on the detected user interactions with the serving beam of the antenna 102a.

If the detected at least one user is in a far-field region, the maximum transmission power detection module 202 determines the maximum transmission power limit of the UE (P$_{MAX\_NR\_limit}$) and the maximum transmission power of the UE 100 (P$_{MAX\_NR}$) using the below Equations:

$$P_{MAX\_NR\_limit} = PD_{max} * \frac{4\pi r^2}{G(r,\theta)}$$ Equation (9)

$$P_{MAX\_NR} = \min(P_{CMAX}, P_{MAX\_NR\_limit})$$ Equation (10)

If the detected at least one user is in a near-field region, the maximum transmission power detection module 202 determines the maximum transmission power limit of the UE (P$_{MAX\_NR\_limit}$) and the maximum transmission power of the UE 100 (P$_{MAX\_NR}$) using the below Equations:

$$P_{MAX\_NR\_limit} = P_{max} * \frac{PD_{max}}{PD_{limit}}$$ Equation (11)

$$P_{MAX\_NR} = \min(P_{CMAX}, P_{MAX\_NR\_limit})$$ Equation (12)

The maximum transmission power detection module 202 provides information about the determined NR power (P$_{NR}$), LTE power (P$_{LTE}$) and maximum transmission power of the UE (P$_{MAX\_NR}$) to the time averaging module 204.

The time averaging module 204 can be configured to estimate the transmission power of the UE 100 for the UL transmission while meeting time averaging requirements. The time averaging requirements can be associated with accumulation of a positive margin and a negative margin of the MPE (normalized MPE) over the time.

For estimating the transmission power of the UE, the time averaging module 204 calculates an uplink factor according to specification defined in the 3GPP standard. The uplink factor can be equal to maxUplinkDutyCycle of RF parameters reported as part of UE-NR-Capability (as defined in 3GPP TS 38.331). Alternatively, the uplink factor can be calculated using a Time Division Duplex (TDD)-UL-DL config IEs using a TDD-UL-DL pattern (as defined in 3GPP TS 39. 331). In an example herein, using Radio Resource Control (RRC) configuration, using the TDDUL-UL-DL IEs UL and DL symbols can be counted and then percentage of the UL symbols of the total symbols can be calculated as the uplink factor, in which flexible symbols can be considered as flexible symbols.

The time averaging module 204 calculates the positive margin (Mp) and the negative margin (Mn) by accumulating Mp and Mn over the time. In an example herein, Mp and Mn are calculated by accumulating Mp and Mn for a T–T$_{window}$ time using the below Equations:
initially, Mp and Mn can be set to 0, Mp=0 and Mn=0;
for every window 'i' in last T–T$_{window}$ time, Mp and Mn can be calculated as:

$$Mp = Mp + \max\left(0, \left(1 - \left(P_{TRANSMIT}(i) * \frac{\text{uplink factor}(i)}{P_{MAX\_NR\_limit}(i)}\right)\right)\right)$$ Equation (13)

$$Mn = Mn + \max\left(0, \left(\left(P_{TRANSMIT}(i) * \frac{\text{uplink factor}(i)}{P_{MAX\_NR\_limit}(i)}\right)\right) - 1\right)$$ Equation (14)

wherein, P$_{MAX\_NR\_limit}$(i) indicates the maximum permissible transmission power of the UE in the i$^{th}$ window, P$_{TRANSMIT}$(i) indicates the transmission power of the UE 100 in the i$^{th}$ window, and uplink factor(i) indicates the i$^{th}$ window uplink factor.

Once Mp, Mn, and the uplink factor are calculated, the time averaging module 204 reports maximum uplink duty cycle (maxUplinkDutyCycle) of the UE 100 as:

$$maxUplinkDutyCycle = \frac{P_{MAX\_NR}}{P_{NR}}$$ Equation (15)

The time averaging module 204 further scales the maximum transmission power of the UE 100 received from the maximum transmission power detection module 202 using the uplink factor and Mn. The maximum transmission power of the UE ($P_{MAX\_NR}$) can be scaled using the below Equation:

$$\text{scaled } P_{MAX\_NR} = \left(\frac{P_{MAX_{NR}}}{\text{uplink factor}}\right) \text{ and negative margin} \quad \text{Equation (16)}$$

$$\text{scaled } P_{MAX\_NR} = P_{MAX\_NR} * (1 - Mn)$$

The time averaging module 204 compares the scaled maximum transmission power of the UE 100 (scaled $P_{MAX\_NR}$) with the NR power ($P_{NR}$). If the scaled maximum transmission power of the UE 100 (scaled $P_{MAX\_NR}$) is greater than or equal to the NR power ($P_{NR}$), the time averaging module 204 estimates the transmission power of the UE 100 as the NR power ($P_{TRANSMIT}=P_{NR}$). Thus, the UE 100 can transmit the signal with the NR power, while satisfying the regulatory limits.

The time averaging module further updates the power headroom and transmits the updated power headroom report (PHR) to the at least one BS. The power headroom indicates how much transmission power is left for the UE 100 to use in addition to the power being used for the current transmission of the signal. The positive power headroom can indicate that the UE 100 can transmit more data if required or the UE 100 is transmitting at a power level that is less than the maximum power. A negative power headroom can indicate that the UE 100 is already transmitting at a power level that is greater than the power level the UE is allowed to transmit. The PHR is a type of MAC Control Element (MAC CE) that reports a headroom between the current transmission power (estimated power) of the UE 100 and a nominal power to the at least one BS. The BS uses the PHR value to estimate how much uplink bandwidth the UE 100 can use for a specific subframe transmission. Thus, the UE 100 cannot use much bandwidth (resource block(s)), if the UE 100 does not have enough power headroom. The time averaging module 204 triggers the PHR based on expiry of at least one of a prohibit timer (phr-ProhibitTimer) and a periodic timer (phr-PeriodicTimer). The prohibit timer can expire when a path loss has changed more than a transmission power factor change (phr-Tx-PowerFactorChange) dB for at least one activated serving cell of any MAC entity (which can be used as a path loss reference), because a last transmission of a PHR in the MAC entity may occur when the MAC entity has UL resources for new transmission. Also, the prohibit timer can expire when there is a change in the UL transmission power and a change in pathloss, which is greater than a threshold defined since the last transmission of the PHR. The periodic timer can expire according to a section 5.4.6 defined in 3GPP TS 38.321. Periodicity of the prohibit timer can be less than periodicity of the periodic timer. The time averaging module 204 can use at least one of the prohibit timer and the periodic timer that expires at the earliest to trigger the PHR if the detected nearest user is interacting with the serving beam in a close range with the UE 100.

In an example herein, the time averaging module 204 updates the power headroom and allowed maximum power reduction metric ($MPR_{RFexposure}$) using the below Equations:

Power headroom=scaled $P_{MAX\_NR}-P_{NR}$     Equation (17)

$MPR_{RFexposure}=(P_{TRANSMIT}-P_{MAX_{NR}})$*antenna gain     Equation (18)

If the scaled maximum transmission power of the UE 100 (scaled $P_{MAX\_NR}$) is lesser than the NR power ($P_{NR}$), the time averaging module 204 checks if the UE 100 can transmit the signal with the scaled maximum transmission power (scaled $P_{MAX\_NR}$) by calculating power margin as illustrated in the below Equation:

power margin=$P_{NR}-P_{MAX\_NR}$     Equation (19)

Further, the time averaging module 204 checks if the gNB can decode a Transport Block (TB) (a group of bits) of the transmitted signal using Hybrid Automatic Repeat Request (HARQ) combination techniques and without exceeding a maximum number of HARQ retransmission.

The time averaging module 204 checks if the gNB can decode the TB using the below condition:

$$\left(\frac{\text{power margin}}{\text{performance gain}}\right) < (maxReTxUE - reTxcount) \quad \text{(Equation 20)}$$

wherein, maxReTxUE indicates a possible maximum number of retransmissions of the TB and reTxcount indicates a number of times that the current TB has already been transmitted. The maxReTxUE can be configured based on implementation of the UE 100. Also, the time averaging module 204 may use learning based methods to determine an exact value of the maxReTxUE. Using learning methods such as a reinforcement learning method, the time averaging module 204 can predict whether there would be CRC pass or fail of the TB using the given UE transmit power and a Modulation and Coding Scheme (MCS) scheme. In an example herein, the value of the maxReTxUE can be calculated as:

max$ReTxUE$=max(max$ReTxUE$,maximum number of retransmissions of a $TB$ observed by the $UE$)     Equation (21)

If the condition in Equation (20) is satisfied, then the time averaging module 204 decides that the UE 100 can transmit the signal with the scaled maximum transmission power (scaled $P_{MAX\_NR}$) and the gNB can decode the TB of the signal using the HARQ combination techniques and without exceeding the maximum number of HARQ retransmissions. On satisfying such condition (as specified in the Equation 20), the time averaging module 204 decides to reduce the transmission power of the UE 100 to meet the regulatory requirements. Thus, the time averaging module 204 estimates the transmission power for the UE 100 as the scaled $P_{MAX\_NR}$ ($P_{TRANSMIT}$=scaled$P_{MAX\_NR}$) and updates the power headroom to send the PHR to the at least one BS. The UE 100 may proceed with the UL transmission using the scaled maximum transmission power of the UE 100. The time averaging module 204 can update the power headroom using the below Equations:

Power headroom=scaled $P_{MAX\_NR}-P_{TRANSMIT}$     Equation (22)

$MPR_{RFexposure}=(P_{TRANSMIT}-P_{MAX\_NR})$*antenna gain     Equation (23)

If the condition in Equation (20) is not satisfied, the time averaging module 204 decides that the at least one BS cannot decode the TB of the signal using the HARQ combination techniques, without exceeding the maximum number of HARQ retransmissions. Then, the time averaging module 204 determines to increase the transmission power of the UE 100 based on accumulation of Mp and Mn.

For increasing the transmission power of the UE 100, the time averaging module 204 checks if Mp is greater than zero (Mp>0). If Mp is greater than zero, the time averaging module 204 estimates/increases the transmission power of the UE based on priorities that are assigned to each UL transmission. The priorities can be assigned based on the UE implementations. In an example herein, a UL transmission involving Physical Uplink Control Channel (PUCCH) or Physical Uplink Shared Channel (PUSCH) with multiplexed control data can be considered as a priority 1 transmission. A transmission involving the PUSCH can be considered as a priority 2 transmission. Embodiments herein are explained further considering the priority 1 and priority 2 transmissions as examples, but it is understood by a person of ordinary skill in the art that other priorities assigned to other type of transmissions can be considered.

In an example, for the priority 1 transmission and for the Inter-band ENDC including the FR2 band, the time averaging module 204 estimates the transmission power of the UE as:

$$P_{TRANSMIT} = (P_{CMAX}, P_{MAX\_NR} *(1+Mp)) \quad \text{Equation (24)}$$

For the priority 1 transmission and for the Inter-band ENDC within the FR1 band, the time averaging module 204 estimates the transmission power of the UE as:

$$P_{TRANSMIT} = \min(P_{CMAX}, P_{LTE}, P_{MAX\_NR} *(1+Mp)) \quad \text{Equation (25)}$$

The time averaging module 204 further updates the power headroom, updates Mp as '0' and considers that scaled$P_{MAX\_NR} = P_{TRANSMIT}$ for further estimation of the transmission power of the UE. The power headroom can be updated using the Equations 22 and 23.

In an example, for the priority 2 transmission and the Inter-band ENDC including the FR2 band, the time averaging module 204 estimates the transmission power of the UE as:

$$P_{TRANSMIT} = \min(P_{CMAX}, P_{MAX\_NR} *(1+Mp/2)) \quad \text{Equation (26)}$$

For the priority 2 transmission and for the Inter-band ENDC within the FR1 band, the time averaging module 204 estimates the transmission power of the UE as:

$$P_{TRANSMIT} = \min(P_{CMAX}, P_{LTE}, P_{MAX\_NR} *(1+Mp/2)) \quad \text{Equation (27)}$$

The time averaging module 204 further updates the power headroom, updates Mp as 'Mp/2' and considers that scaled$P_{MAX\_NR} = P_{TRANSMIT}$ for further estimation of the transmission power of the UE. The power headroom can be updated using Equations 22 and 23.

If the gNB cannot decode the TB of the signal using the HARQ combination techniques and without exceeding the maximum number of HARQ retransmissions and no positive margin is accumulated, the time averaging module 204 checks the accumulation of the negative margin (Mn) (if Mp=0 and Mn=0). If Mn=0, the time averaging determines the priority assigned for the UL transmission. On determining that the UL transmission is not a priority 1 transmission, then the time averaging module 204 provides instructions to the recovery procedure module 206 to initiate recovery procedures and updates the power headroom using Equations 22 and 23. On determining that the UL transmission is a priority 1 transmission, the time averaging module 204 estimates the transmission power of the UE 100 as the NR power ($P_{TRANSMIT} = P_{NR}$) and updates Mn as $$\left(\frac{P_{NR}}{P_{MAX\_NR}}\right) - 1.$$

The time averaging module 204 further updates the power headroom as:

$$\text{Power headroom} = \text{scaled } P_{MAX_{NR}} *(1-Mn) - P_{TRANSMIT} \quad \text{Equation (28)}$$

$$MPR_{RFexposure} = (P_{TRANSMIT} - P_{MAX\_NR} *(1-Mn))* \text{antenna gain} \quad \text{Equation (29)}$$

If Mn is not equal to zero (i.e., when the UE is in the negative margin), the time averaging module 204 checks if Mp is equal to zero and Mn is greater than zero. If Mp=0 and Mn>0, the time averaging module 204 determines that the UE 100 has not received corresponding Transmission Power Control (TPC) command from the at least one external entity in response to the PHR previously sent by the UE 100 to the at least one BS. Further, on deciding that the UE 100 has not received the TPC command from the at least one BS, the time averaging module 204 provides the instructions to the recovery procedure module 206 to initiate the recovery procedures and updates the power headroom and the $MPR_{RFexposure}$ using the Equation 23. The power headroom can be updated as:

$$\text{Power headroom} = \text{scaled } P_{MAX_{NR}} *(1-Mn) - \text{scaled } P_{MAX_{NR}} \quad \text{Equation (30)}$$

The recovery procedure module 206 can be configured to initiate the recovery procedures when the at least one BS cannot decode the TB of the signal using the HARQ combination techniques, no positive margin has been accumulated, and the UE 100 is in the negative margin (without exceeding the maximum number of HARQ retransmissions). The recovery procedures may include at least one of a recovery procedure through SRS transmissions and beam failure recovery procedures.

The recovery procedure module 206 checks if DL of the UE 100 is in synchronization (sync) with the at least one BS (for example: the gNB). If the DL of the UE 100 is in sync with the at least one BS, the recovery procedure module 206 provides instructions to the SRS transmission module 208 to initiate the recovery procedure through the SRS transmissions. If the DL of the UE 100 is not in sync with the at least one BS, the recovery procedure module 206 provides instructions to the beam failure recovery module 210 to initiate the beam failure recovery procedures.

The SRS transmission module 208 can be configured to perform the recovery procedures by selecting an SRS port (i.e., a serving beam of the antenna with which the user interactions may be less than the current serving beam) when the DL of the UE is in sync with the at least one BS.

For selecting the best SRS port, the SRS transmission module 208 calculates maximum transmission power for transmission beams of the UE ('P(i)') and normalized path loss ('PL(i)') based on measurements of the DL transmission (such as Reference Signal Received Power (RSRP) value, CSI-RS measurements, and so on). The normalized path loss ('PL(i)') can be calculated as:

$$PL(i) = Pr(i) - Pr\_max \quad \text{Equation (31)}$$

In Equation (31), Pr(i) indicates received signal power of the $i^{th}$ beam, the Pr_max indicates a maximum value of Pr(i).

Further, the SRS transmission module 208 selects SRS ports for next transmissions. The SRS ports may be selected based on the following criteria:

(1) for every serving beam, the SRS transmission module 208 may find the normalized transmission power $P_{NORM}(i)$ by adding the maximum transmission power and normalized pathloss ($P_{NORM}(i) = P(i) + PL(i)$) and sorting $P_{NORM}$ in descending order. Thereafter, the SRS transmission module 208 may select a first 'n' SRS ports based on configured SRS resources; and (2) for every serving beam, the SRS transmission module 208 may find the normalized transmission power $P_{NORM}(i)$ by adding the maximum transmission power and normalized pathloss ($P_{NORM}(i)=P(i)+PL(i)$) and sorting $P_{NORM}$ in descending order. Thereafter, the SRS transmission module 208 may select a first 'n−1' excluding current serving beam, and includes the current serving beam with reduced transmission power calculated by the time averaging module 204.

Once the SRS ports are selected, the SRS transmission module 208 transmits the selected SRS ports at the power ('P(i)') to the at least one BS and waits for a next scheduled SRS transmission. In response to the transmitted selected SRS ports, the SRS transmission module 208 may receive a Sound Resourcing Indication (SRI) report from the at least one BS. The SRI may indicate beams based on the SRS ports transmitted by the SRS transmission module 208. The beams may include PUSCH and PUCCH beams. The UE 100 cannot use a beam other than the beams indicated by the at least one BS through the SRI report, because the at least one BS may tune a receiver beam thereof according to the SRI report transmitted to the UE 100. Thus, in order to transmit the PUSCH and the PUUCH in the desired beams of the UE 100, the SRS transmission module 208 can influence the at least one BS by transmitting the selective SRS ports.

On receiving the SRI report from the at least one BS, the SRS transmission module 208 checks if the received SRI report indicates a SRS port from among the SRS ports, which have been selected and transmitted by the SRS transmission module 208. If the indicated SRI port is among the transmitted SRS ports, then the SRS transmission module 208 provides information about the selected SRS port by indicating a completion of the recovery procedure to the time averaging module 204 for estimating the transmission power of the UE. If the indicated SRI port is not transmitted by the SRS transmission module 208, then the SRS transmission module 208 provide instructions to the beam failure recovery module 210 to initiate the beam failure recovery procedures.

The beam failure recovery module 210 can be configured to perform the beam failure recovery procedures when the DL of the UE is not in sync with the at least one BS or when the desired SRS port indication is not received from the at least one BS. The beam failure recovery module 210 identifies a new candidate beam based on at least one of a synchronization signal block (ssb) index and Channel State Information Reference Signal (csi-rs) index, which cross a candidate beam threshold configured by a Radio Resource Control (RRC). The beam failure recovery module 210 triggers a Random Access Procedure (RACH) procedure using Contention Free Random Access (CFRA) corresponding to the identified new candidate beam. In response to the RACH procedure, the beam failure recovery module 210 receives a response from the at least one BS on a Control Resource Set-Beam Failure Recovery (CORESET-BFR) whose Transmission Configuration Indication (TCI) state may correspond to the identified new candidate beam. After receiving the response from the gNB, the beam failure recovery module 210 may indicate the completion of the recovery procedure to the time averaging module 204 for estimating the transmission power of the UE 100.

FIG. 2 show exemplary modules of the processor 108, but the embodiments are not limited thereto. In other embodiments, the processor 108 may be configured to include fewer or additional modules. Further, the labels or names of the modules are used only for illustrative purpose and does not limit the scope of the embodiments herein. One or more modules can be combined together to perform same or substantially similar function in the processor 108.

Figure 3A:
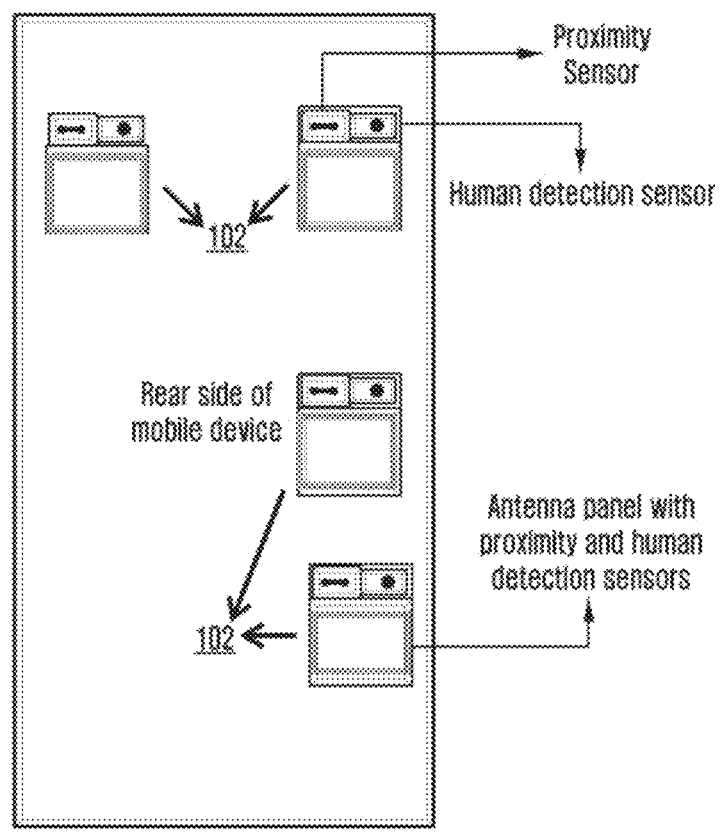
FIG. 3A is a diagram illustrating the UE with an antenna panel and sensors, according to an embodiment.
Figure 3A:
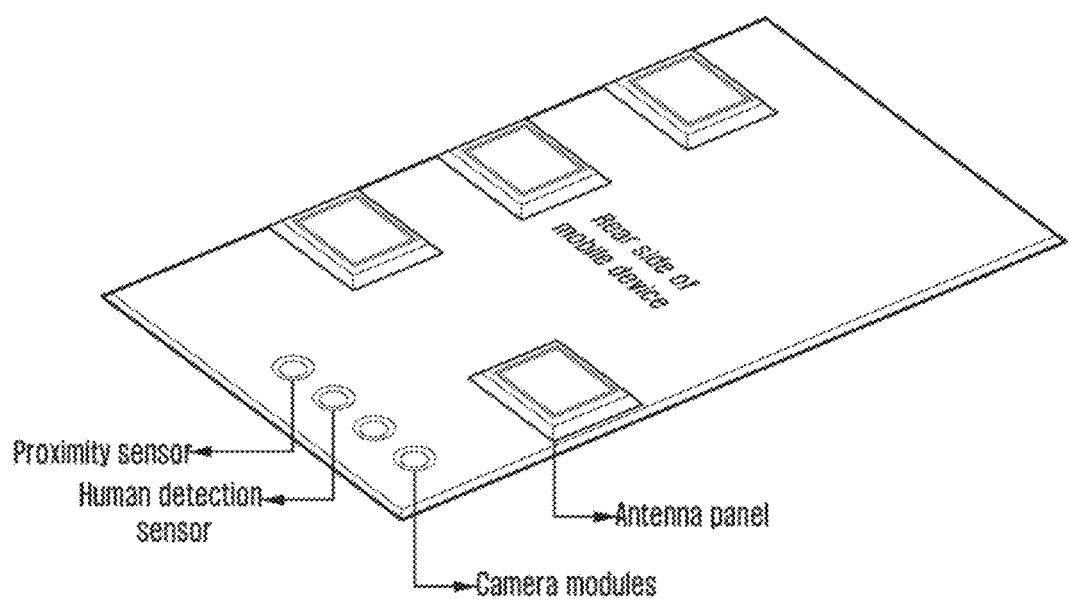

FIG. 3A is a diagram illustrating the UE 100 with the antenna panel 102 and the sensors 104, according to an embodiment. The UE 100 includes the sensors 104 coupled to the antenna panel 102. In an example, the sensors 104 can be placed on a rear side of the UE 100 as illustrated in FIG. 3A. Examples of the sensors 104 can be, but are not limited to, at least one of proximity sensors, grip or pressure sensors, human detection sensors, camera modules, camera depth sensors and so on. The sensors 104 can be used to detect or capture the information related to the at least one user. The information can be at least one of presence of the at least one user, the distance and position of the at least one user from the serving beam of the antenna 102a, and so on. The processor 108 of the UE 100 may further collect the information from the sensors 104 and process the information (using image processing methods, image classification methods and so on) to detect the position and distance of the at least one user from the serving beam of the antenna 10a.

Figure 3B:
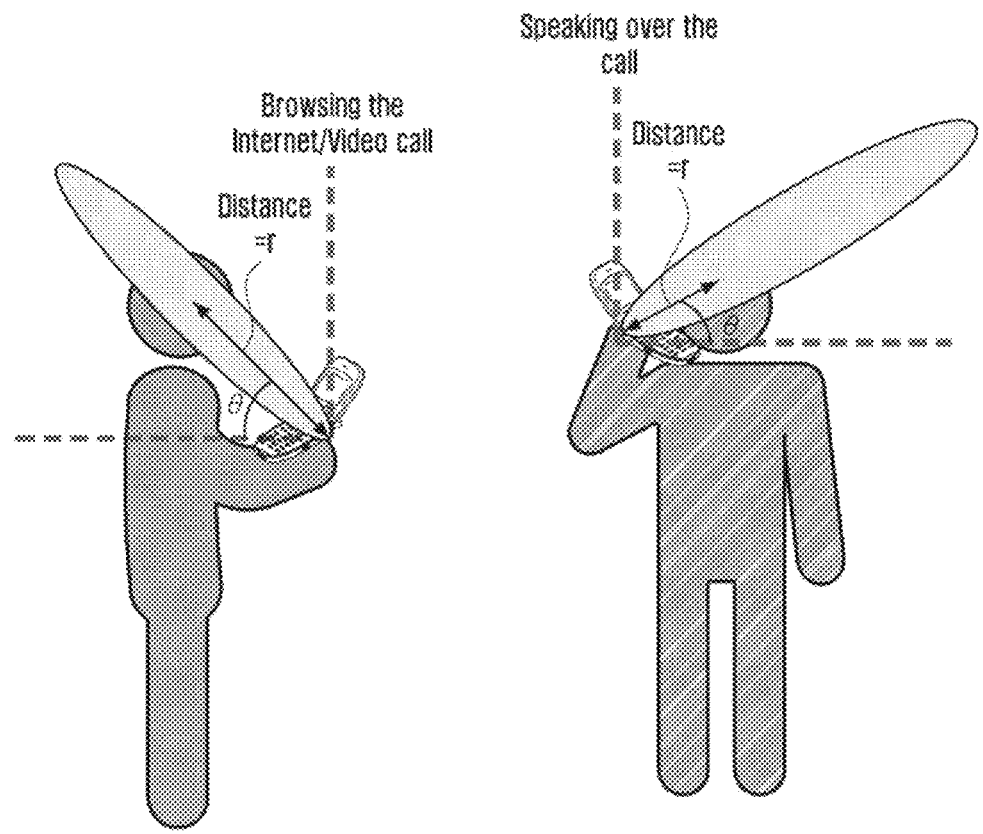
Figure 3B:
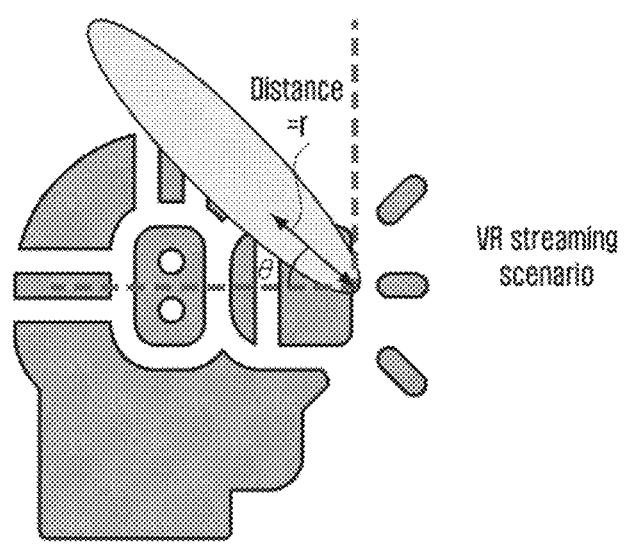

Based on the information received from the sensor and/or processed information, the processor 108 determines the user interactions with the serving beam of the antenna 102a. Example scenarios depicting the user interactions with the serving beam are illustrated in FIG. 3B. The scenarios can be at least one of browsing the Internet, a video call scenario, a user speaking over a phone scenario while holding the phone hear the head, Virtual Reality (VR) streaming scenarios, a user speaking over a phone scenario using a speaker while holding the phone away from the head, a user speaking over a phone scenario using a speaker while the phone is mounted to a portion of a motor vehicle, and so on.

Figure 3C:
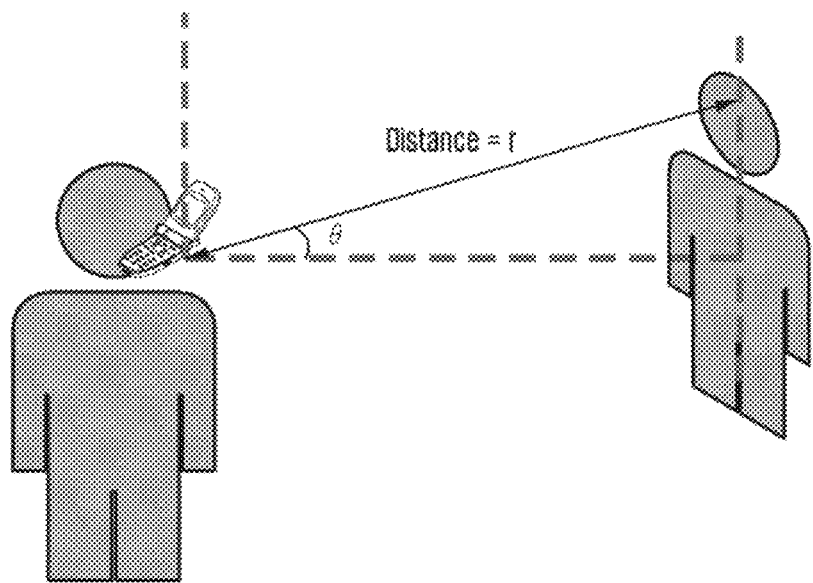

Based on the information received from the sensor and/or processed information, the processor 108 may also determine at least one neighbor of the at least one user interacting with the serving beam of the antenna 102a. An example scenario is illustrated in FIG. 3C, wherein the neighbor is interacting with the serving beam.

Figure 3D:
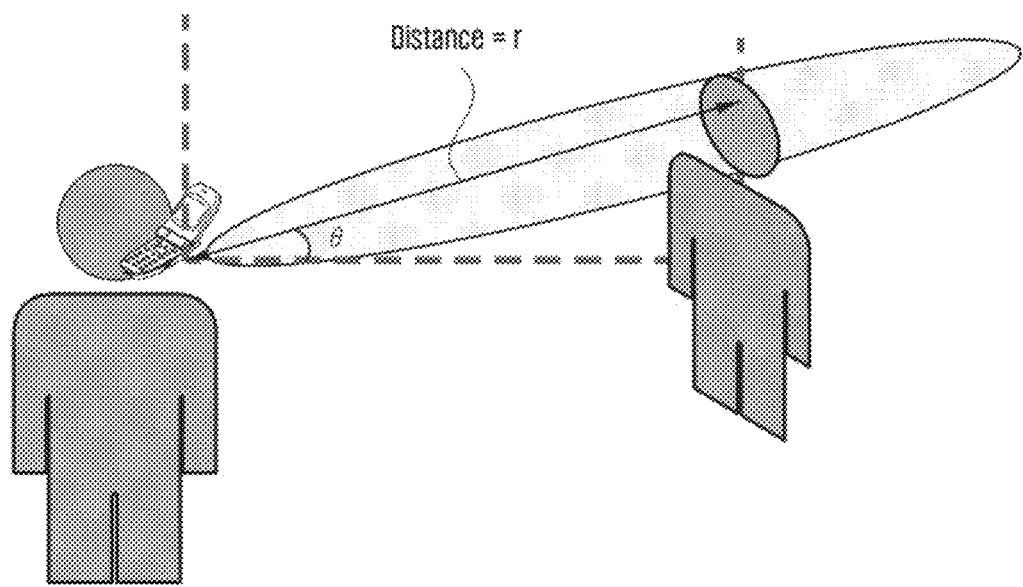

Based on the information received from the sensor and/or processed information, and the serving beam gain pattern, the processor 108 may determine the user interacting with the serving beam and estimate the antenna gain as illustrated in FIG. 3D.

Figure 4:
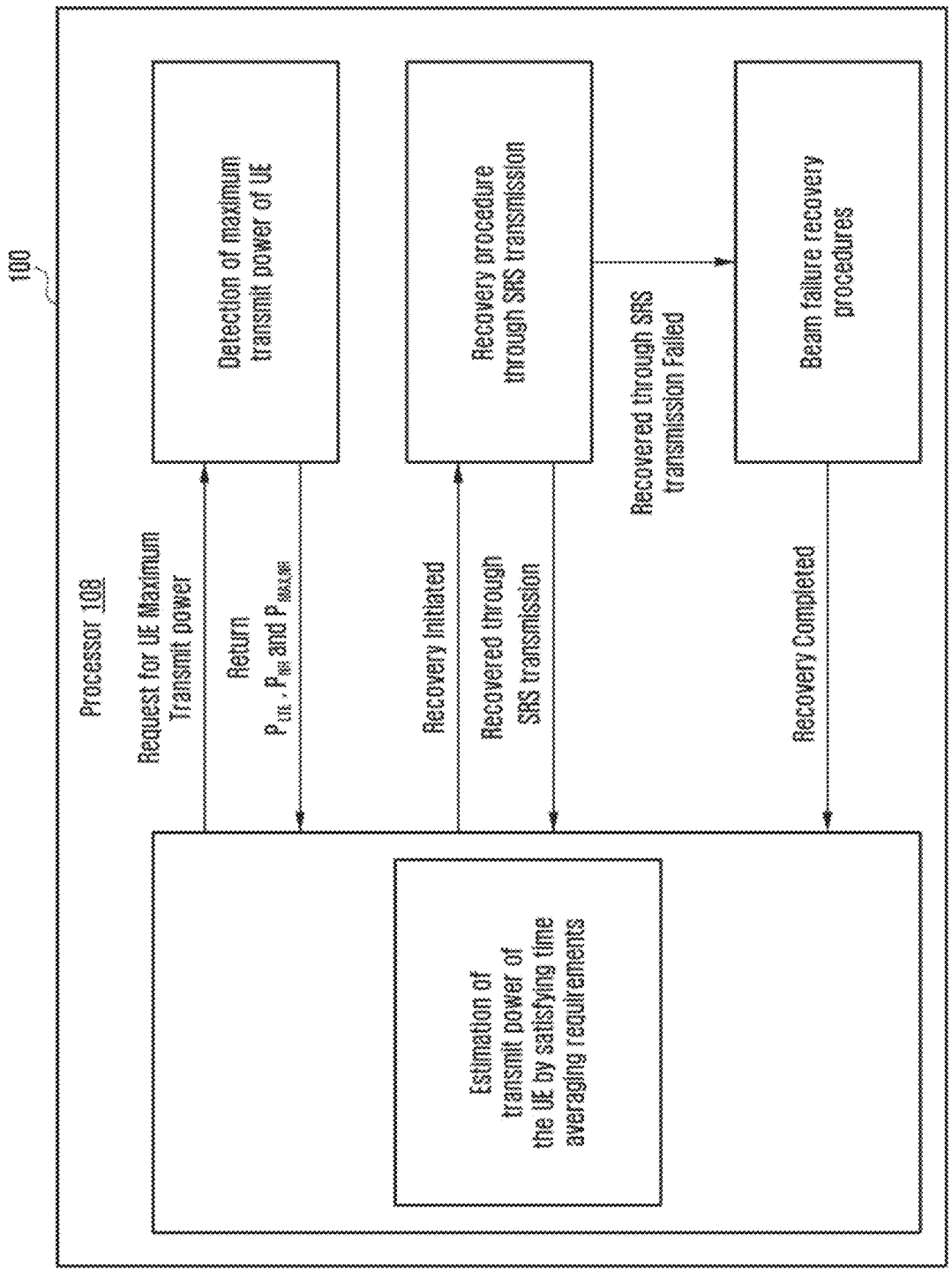
FIG. 4 is a block diagram illustrating a configuration of a processor for adaptively estimating the transmission power of the UE, according to an embodiment.

FIG. 4 is a block diagram illustrating a configuration of the processor 108 for adaptively estimating the transmission power of the UE 100, according to an embodiment. The processor 108 receives the information from the sensors 104 and detects the user interactions with the signal transmitted by the UE 100. Based on the user interactions, the processor 108 determines the maximum transmission power of the UE 100.

Based on the determined maximum transmission power, the processor 108 estimates the transmission power of the UE 100 for the uplink transmission, which comply with the time averaging requirements/regulatory limits. The processor 108 compares the determined maximum transmission power with the transmitter power requirement of the NR/NR power. If the determined maximum transmission power is greater than or equal to the NR power, than the processor 108 estimates the transmission power of the UE 100 as the NR power and updates the power headroom, so the UE 100 can transmit with the NR power.

If the determined maximum transmission power is less than the NR power, the processor 108 checks if the UE 100 can transmit the TB of the signal with the estimated maximum transmission power and the at least one BS can decode the transmitted TB using the HARQ techniques and without exceeding the maximum number of HARQ retransmissions. If such a condition is satisfied, then the processor 108 enables the UE 100 to transmit the signal with the determined maximum transmission power and updates the power headroom.

If the at least one BS cannot decode the transmitted TB using the HARQ techniques and without exceeding the maximum number of HARQ retransmissions, the processor 108 checks for the accumulation of the positive margin and the negative margin. If there is accumulation of the positive margin, the processor 108 increases the transmission power of the UE 100 for the UL transmission based on the priorities assigned to the UL transmission.

If the at least one BS cannot decode the transmitted TB using the HARQ techniques and without exceeding the maximum number of HARQ retransmissions, no positive margin has been accumulated and the UE 100 is in the negative margin, the processor 108 initiates the recovery procedures.

The processor 108 initiates the recovery procedure through the SRS transmission on determining that the DL of the UE 100 is in sync with the at least one BS. The processor 108 initiates the beam failure recovery procedures on determining that the DL of the UE 100 is not in sync with the at least one BS or a failure of the recovery procedure through the SRS transmission. Once the recovery procedure is completed, the processor 108 estimates the transmission power of the UE 100 by following the regulatory limits.

Figure 5A:
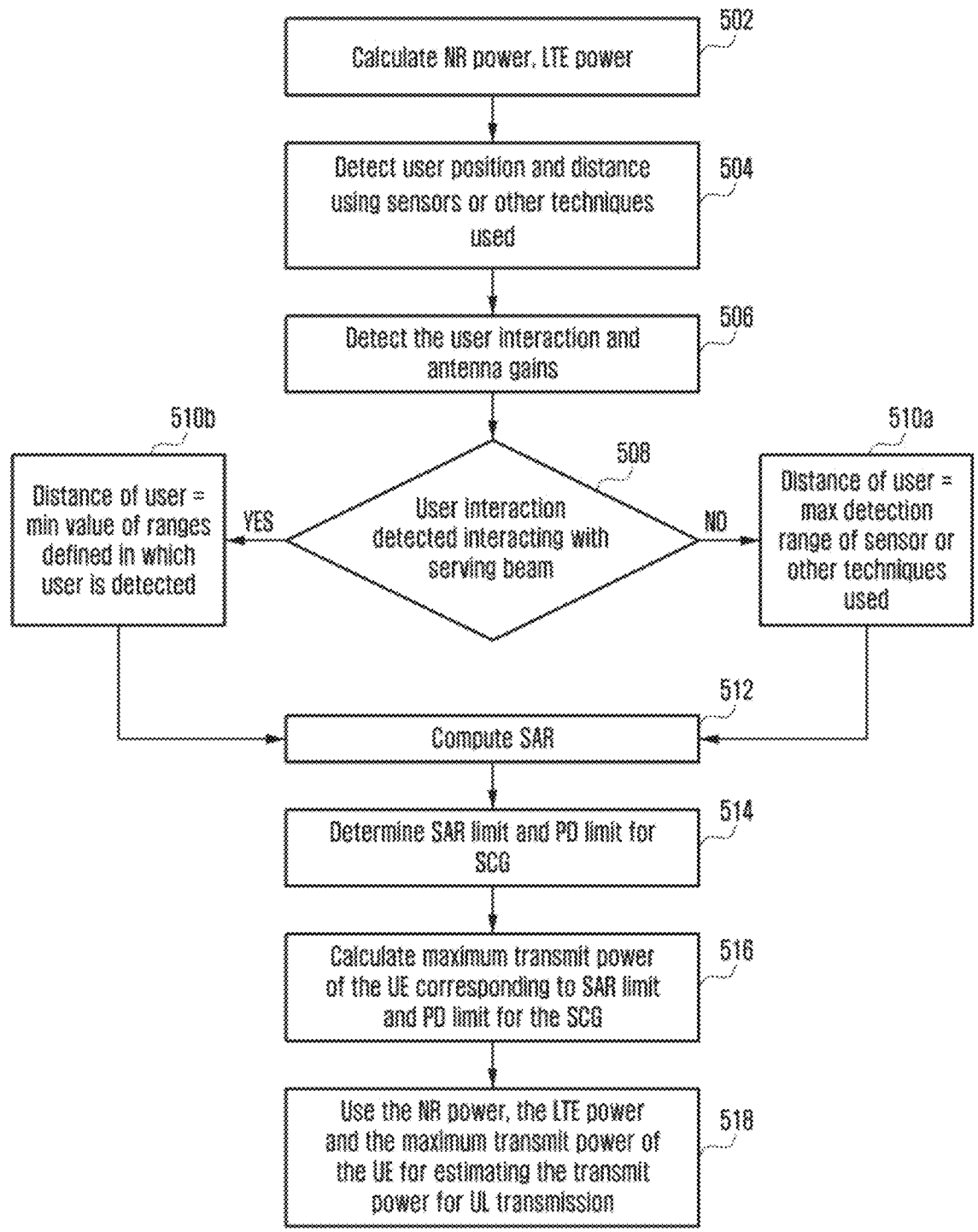
FIG. 5A is a flowchart illustrating a method of determining the maximum transmission power of the UE based on the user interactions, according to an embodiment.

FIG. 5A is a flowchart illustrating a method of determining the maximum transmission power of the UE 100 based on the user interactions, according to an embodiment. The UE 100 under control of the processor 108 calculates (at step 502) the transmitter power requirements of the NR and the LTE ($P_{NR}$ and $P_{LTE}$) according to the mode of operation of the UE 100. Based on the received information from the sensors 104 and/or processed information received from the sensors 104, the processor 108 detects (at step 504) the position and distance of the at least one user with respect to the antenna 102a. Based on the detected position and distance, the processor determines (at step 506) the user interactions and the antenna gain. The processor 108 further checks (at step 508) if the detected user interactions are interacting with the serving beam of the antenna 102a. If the detected user interactions are not interacting with the serving beam, the processor 108 determines (at step 510a) the distance of the at least one user as the maximum detection range of the sensors 104 and/or the techniques/methods used. Otherwise, the processor 108 determines (at step 510b) the distance of the at least one user as the minimum value of ranges defined in which the at least one user is detected.

Once the distance of the user is determined, the processor 108 computes (at step 512) the SAR according to the 3GPP specification. The processor 108 determines (at step 514) the $SAR_{limit}$ for the Inter-band ENC within the FR1 band or the $PD_{limit}$ for the Inter-band ENC including the FR2 band. The processor calculates (at step 516) the maximum transmission power of the UE 100 corresponding to the $SAR_{limit}$ and the $PD_{limit}$ for the SCG. The processor 108 (at step 518) uses the calculated $P_{NR}$, $P_{LTE}$ and $P_{MAX\_NR}$ for estimating the transmission power of the UE in consideration of the regulatory limits.

FIG. 5B is a table illustrating the interpolation of experimental data to calculate the SAR, according to an embodiment.

Figure 6:
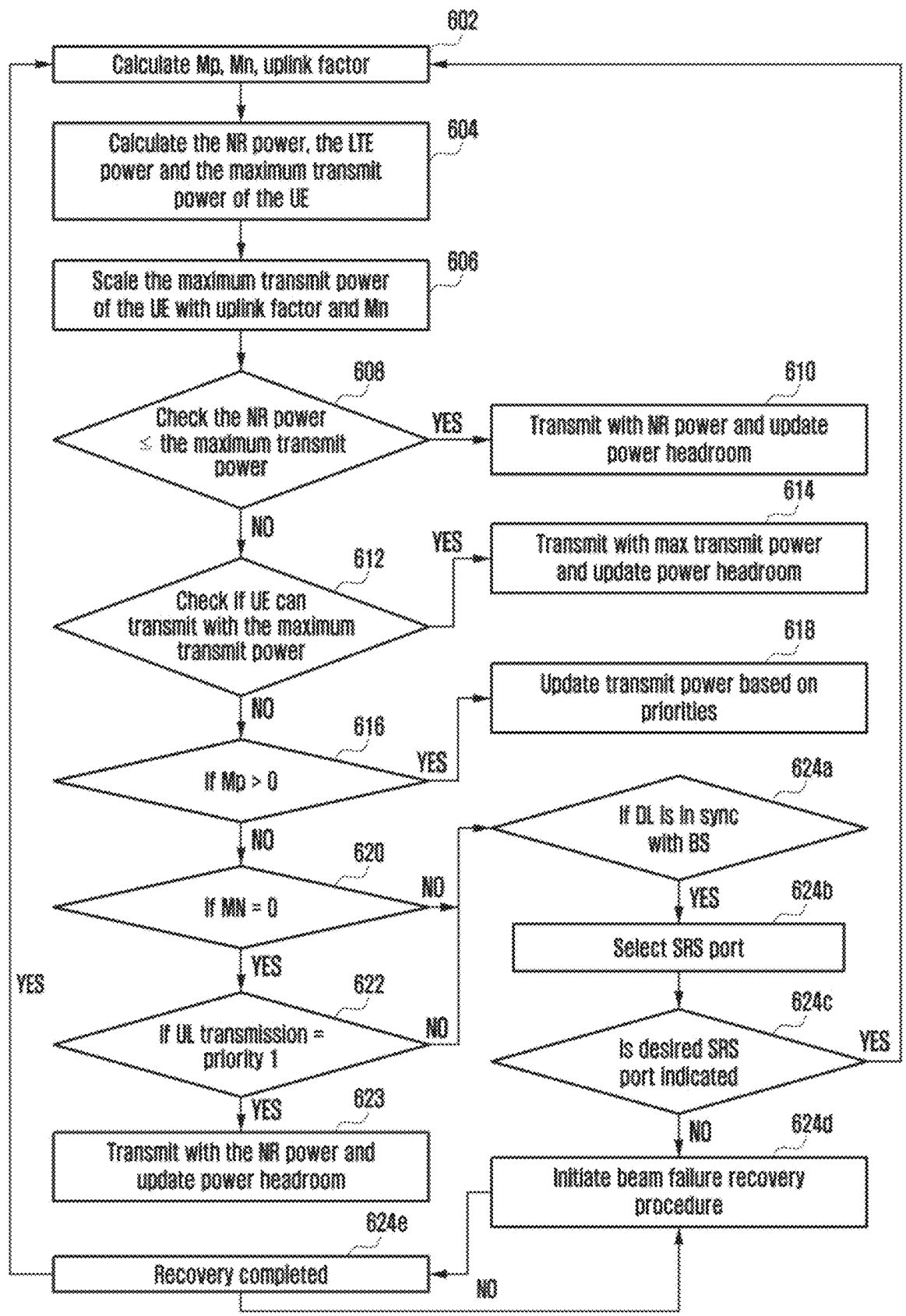
FIG. 6 is a flowchart illustrating a method of estimating the transmission power of the UE by following regulatory limits, according to an embodiment.

FIG. 6 is a flowchart illustrating a method of estimating the transmission power of the UE by following the regulatory limits, according to an embodiment. The processor 108 calculates (at step 602) Mp, Mn and the uplink factor. The processor 108 calculates (at step 604) the $P_{NR}$, the $P_{LTE}$ and the $P_{MAX\_NR}$ (as illustrated in FIG. 5). The processor 108 scales down (at step 606) the $P_{MAX\_NR}$ using the uplink factor and Mn. The processor 108 checks (at step 608) if the scaled $P_{MAX\_NR}$ is greater than or equal to the $P_{NR}$. If the $P_{MAX\_NR}$ is greater than or equal to the $P_{NR}$, the processor 108 enables (at step 610) the UE 100 to transmit the signal with the $P_{NR}$ and updates the power headroom using the Equation 17.

If the $P_{MAX\_NR}$ is not greater than or equal to the $P_{NR}$, the processor 108 checks (at step 612) if the UE 100 can transmit with the $P_{MAX\_NR}$ and the gNB can decode the TB using the HARQ combinations and without exceeding the maximum number of HARQ retransmissions. If the UE 100 can transmit with the $P_{MAX\_NR}$ and the gNB can decode the TB using the HARQ combinations and without exceeding the maximum number of HARQ retransmissions, the processor 108 enables (at step 614) the UE 100 to transmit the signal with the $P_{MAX\_NR}$ and updates the power headroom using the Equation 22. Otherwise, the processor 108 checks (at step 616) if Mp is greater than zero. If Mp is greater than zero, then the processor 108 (at step 618) increases/updates the transmission power of the UE 100 based on the priorities assigned to the transmission, updates the power headroom using the Equation 22 and performs operations specified at step 610.

If Mp is not greater than zero, the processor 108 checks (at step 620) if Mn is equal to zero. If Mn is equal to zero, the processor 108 checks (at step 622) whether the current uplink (UL) transmission is the priority 1 transmission. If the current uplink transmission is the priority 1 transmission, then the processor 108 enables the UE 100 to transmit (at step 623) with the NR power and updates the power headroom using the Equation 22 and Mn using the Equation 23.

If Mn is not equal to zero (at step 620) or the uplink transmission is not the priority 1 transmission (at step 622), the processor 108 initiates (at step 624) the recovery procedure(s). The processor 108 checks (at step 62a) whether the downlink (DL) transmission of the UE 100 is in sync with the gNB. If the DL is in sync with the gNB, the processor 108 initiates (at step 624b) the recovery procedure through the SRS transmission. The processor 108 selects and transmits the SRS ports to the gNB and waits till the next scheduled SRS transmission to obtain the SRI report from the gNB. On receiving the SRI report from the gNB, the processor 108 checks (at step 624c) whether the received SRI report indicates the SRI port to be used, which is among one of the selected SRS ports. If the indicated SRI port is among one of the selected SRS ports, the processor 108 identifies the successful completion of the recovery procedure and performs operations specified at step 602. If the indicated SRI port is other than the selected SRI ports, then the processor 108 indicates the failure of the recovery procedure through the SRS transmission.

If the DL is not in sync with the gNB and the recovery procedure through the SRS transmission has failed, then the processor 108 initiates (at step 624d) the beam failure recovery procedure. The processor 108 identifies the new candidate beam using at least one of the ssb-index and the csi-rs index and performs the RACH procedure using the CFRA corresponding to the identified new candidate beam. On receiving the response from the gNB in response to the RACH procedure, the processor 108 identifies (at step 624e) the successful completion of the recovery procedure and performs the operations specified at the step 602 to estimate the transmission power of the UE 100 in compliance with regulatory conditions.

FIG. 7 is a diagram illustrating adaptive calculation of the transmission power of the UE, according to an embodiment. In the example scenario illustrated in FIG. 7A, a user A, a user B, a user C, and a user D have interactions with a serving beam index '2'. The users may be browsing the Internet, speaking over the call, executing a VR streaming scenario, in proximity of a neighboring user making a call using the user's UE, and so on. In such scenarios, the processor 108 calculates the maximum transmission power of the UE 100 based on the user interactions with the serving beam index '2'. In an example herein, the processor 108 estimates that the transmission power of the UE 100 as the calculated maximum transmission power to meet the regulatory limits. Therefore, the UE 100 can transmit using the maximum transmission power and updates the power headroom using the Equation 22.

Figure 8A:
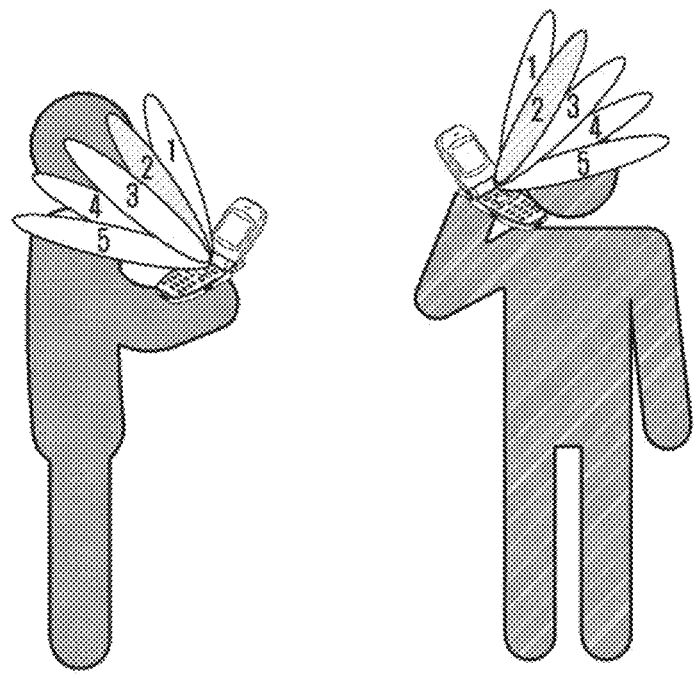
FIGS. 8A and 8B are diagrams illustrating the selection of Sounding Reference Signal (SRS) ports while performing the recovery procedures, according to an embodiment.
Figure 8A:
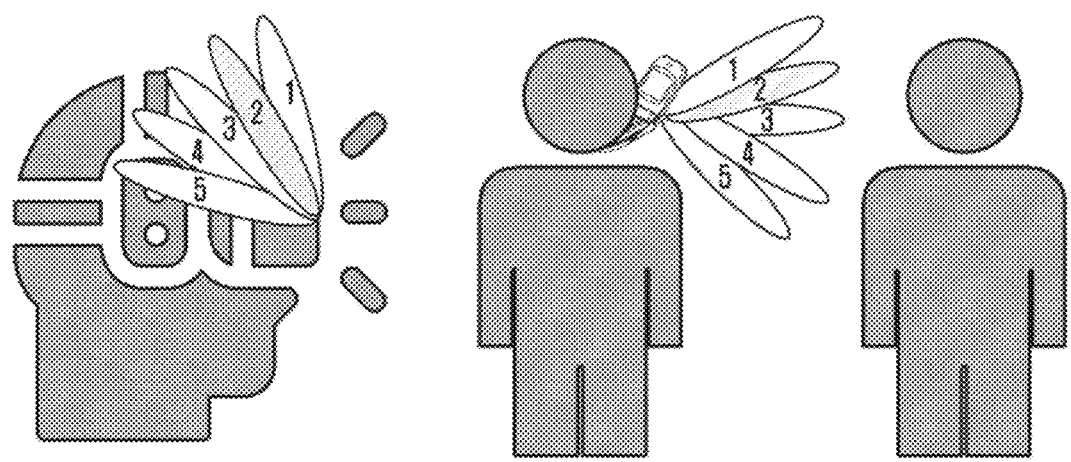
Figure 8B:
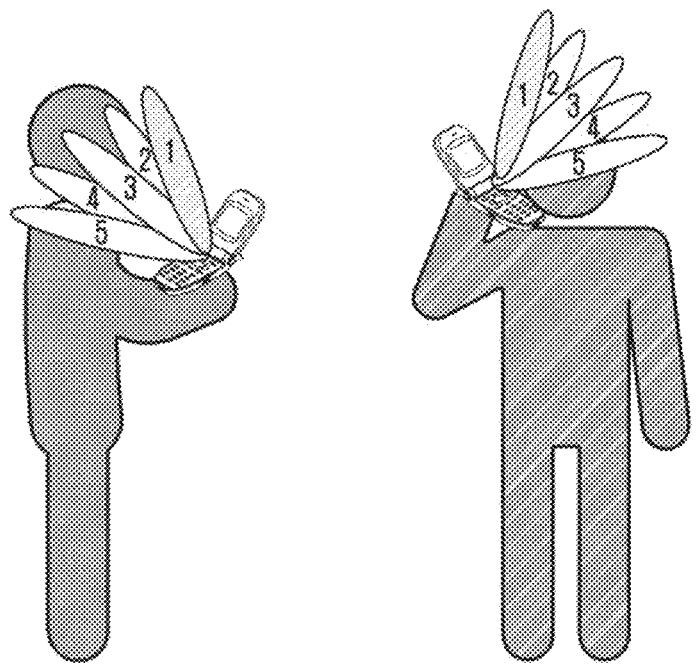
Figure 8B:
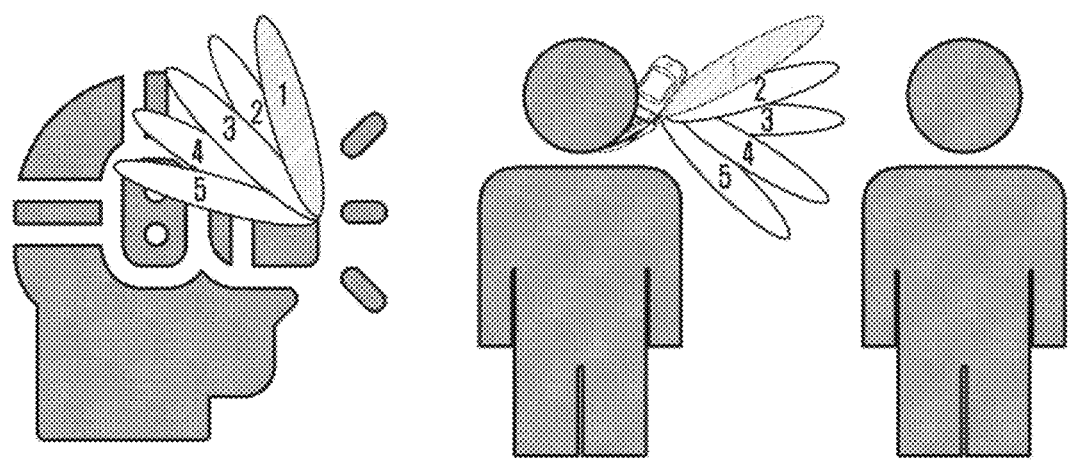

FIGS. 8A and 8B are diagrams illustrating the selection of the SRS ports while performing the recovery procedures, according to an embodiment.

With respect to FIGS. 8A and 8B, a user A, a user B, a user C, and a user D have interactions with the serving beam index '2'. In such a scenario, the processor 108 calculates the maximum transmission power of the UE 100 based on the user interactions. Based on the calculated maximum transmission power, the processor 108 determines that the transmission power of the UE 100 is to be reduced to comply with the regulatory limits. The processor 108 also determines that the BS (for example: the gNB) may be unable to decode the transmitted TB with or without retransmissions and the HARQ combining techniques and no positive margin is accumulated. Further, the UE 100 is in the negative margin. In such a case, the processor 108 initiates the recovery procedure through the SRS transmission to select the SRS port that can indicate at least one other beam with which the user interactions may be less. In order to select the SRS port, the processor 108 calculates the normalized transmission power for every beam (1, 2, 3, 4, and 5), and selects and transmits the SRS ports based on the calculated normalized transmission power to the gNB. The processor 108 receives the SRI report from the gNB indicating the SRS port to be used for the transmission. In an example herein, the received SRS port may indicate the serving beam index '1' as shown in FIG. 8b. Thus, there may be fewer user interactions with the serving beam index '1'.

FIG. 8C is a diagram illustrating prediction of the SRS port and the power headroom, according to an embodiment. Embodiments herein enable the processor 108 to use the information/data received from the sensors 104 at different time samples to predict the user interactions with the serving beam. For example, the processor 108 may use the sensor data received at time T=t0 and t1 to predict the user interactions with the serving beam at t=t2 beforehand. Thereafter, the processor 108 can predict the PHR in advance using the predicted user interaction with the serving beam. The processor 108 can also use the predicted user interaction to predict the SRS ports to be used for transmission in advance.

Figure 9:
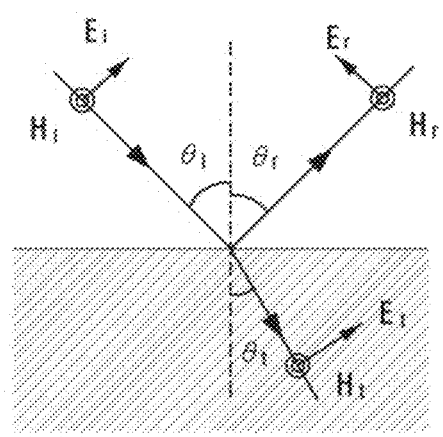
FIG. 9 is a diagram illustrating a method of achieving maximum power reflection co-efficient, according to an embodiment.
Figure 9:
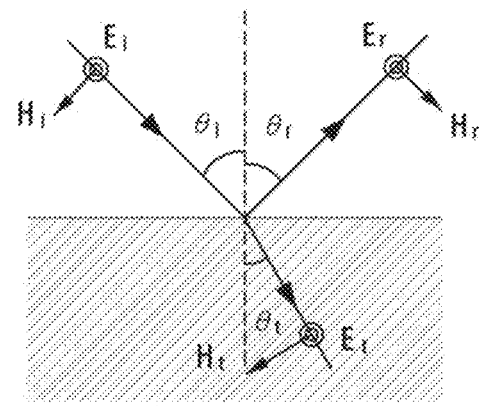

FIG. 9 is a diagram illustrating a method of achieving maximum power reflection co-efficient, according to an embodiment. Embodiments herein enable the processor 108 to achieve maximum power reflection coefficient by following the regulatory limits.

The processor 208 of the UE 100 can estimate an angle of incidence at an air-skin interface and estimate reflection co-efficient from a look-up-table (LUT). The processor 208 further achieves maximum power reflection (improves signal quality) by satisfying the regulatory compliances.

The processor 108 can change the serving beam in order to change an angle of incidence at an air-skin (of the user) interface to achieve the maximum power reflection coefficient by following the regulatory compliances.

The processor 108 can adjust the power ratio between cross-polarized antennas for changing effective polarization (a parallel polarization in (a) of FIG. 9 or a perpendicular polarization in (b) of FIG. 9) at the air-skin interface. Thus, the maximum power reflection coefficient can be achieved at a given angle of incidence at the air-skin interface found using the data received from the sensors 104.

The processor 108 can change the serving beam and can adjust the power ratio between the cross-polarized antennas to achieve the maximum power reflection coefficient.

Figure 10:
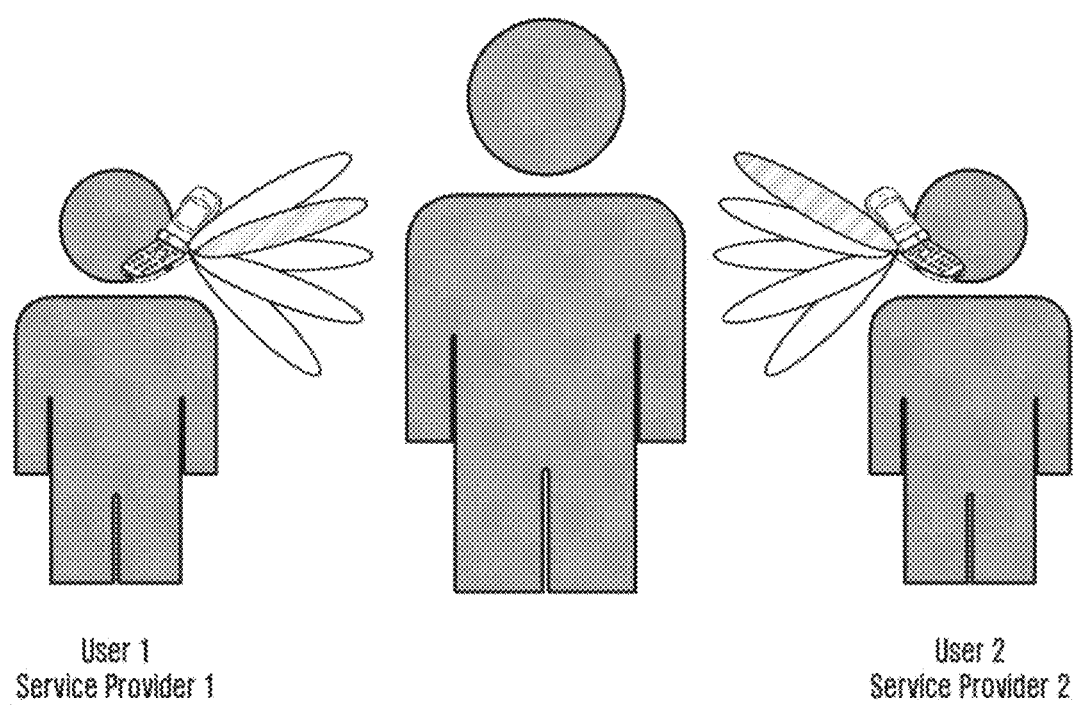
FIG. 10 is a diagram illustrating multi-service provider scenarios, according to embodiments as disclosed herein.

FIG. 10 is a diagram illustrating multi-service provider scenarios, according to embodiments as disclosed herein.

With respect to FIG. 10, a user 1 is speaking over the call using a SIM of a service provider 1, a user 2 is speaking over the call using a SIM of a service provider 2, and a user 3 is in between the user 1 and the user 2. In such a configuration, if communications between the UEs of the users are not established then the UE 100 operated by the user 1 and the UE 100 operated by the user 2 may have independently estimated their transmission power, which may cause the user 3 detected in a field of both the user 1 and the user 2 to get exposed to double the radiation limit. Thus, in such a scenario, the UE should communicate with other UEs in its vicinity to obtain other UE positions and their user interaction information for deciding the transmission power such that no user may be exposed to the radiation greater than the regulatory limit.

FIGS. 11A, 11B, 11C, 11D, 11E, and 11F are diagrams illustrating transmissions of the UE with the transmission power that meets the regulatory limits, according to an embodiment.

Figure 11A:
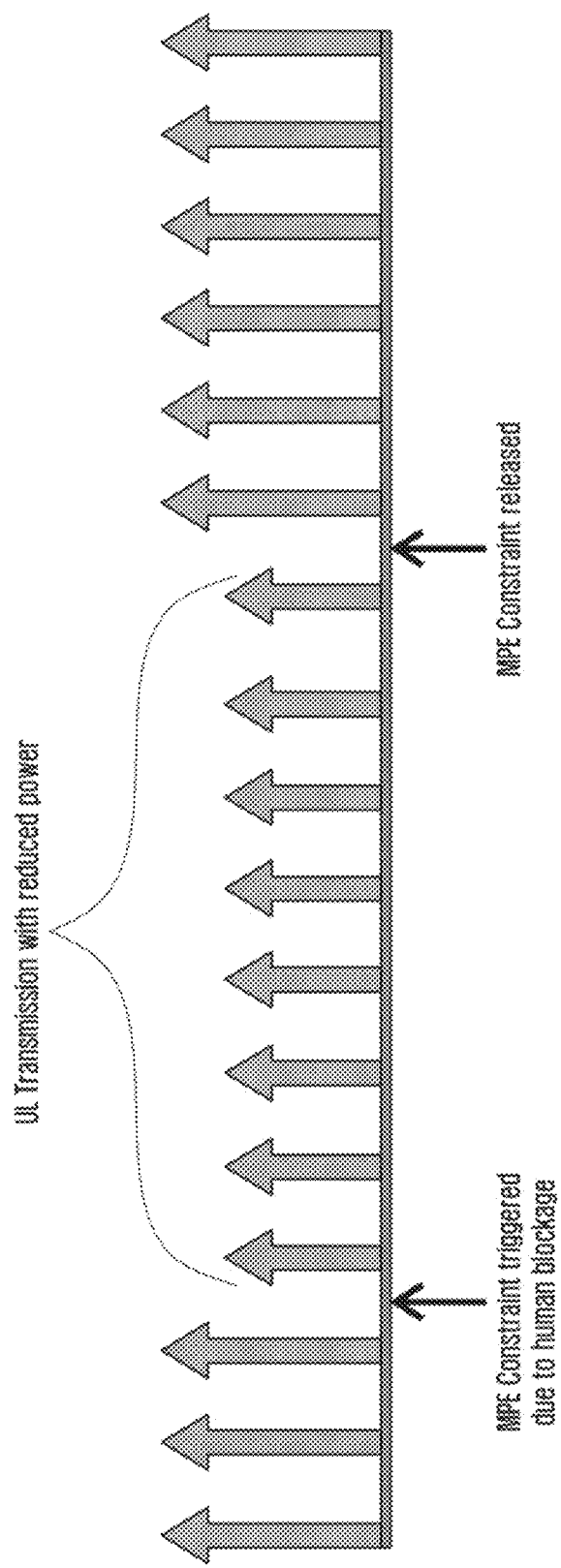

With respect to FIG. 11A, the UE 100 encounters blockage/interaction/presence of the user and the UE 100 reduces the transmission power to meet the regulatory limits. In such a scenario, the UE 100 initially determines that the gNB can decode the transmitted TB with or without the HARQ retransmissions and the HARQ combining techniques while the UE 100 transmitting with reduced power. In such a case, the UE 100 may transmit with reduced power. Once the user blockage is removed, the UE 100 may transmit using the previous transmission power by returning to a normal mode of operation.

Figure 11B:
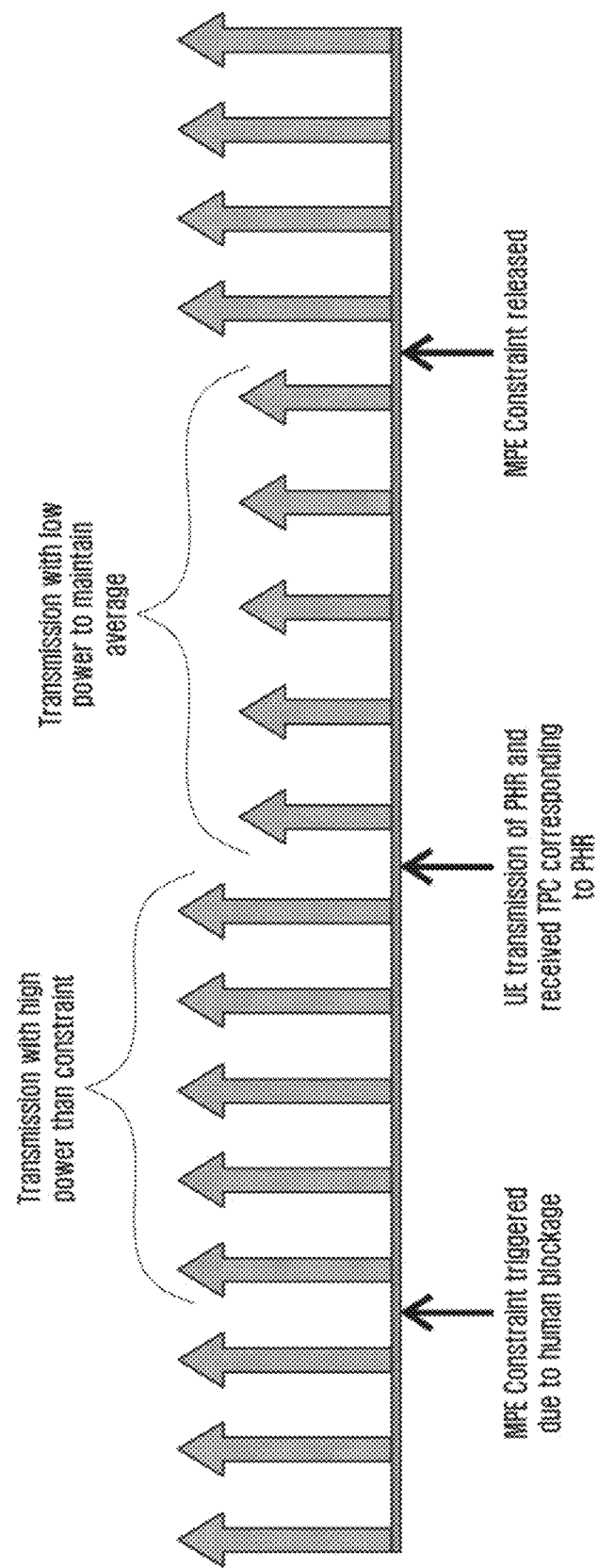

With respect to FIG. 11B, the UE 100 encounters blockage/interaction/presence of the user and the UE 100 reduces the transmission power to meet the regulatory limits. In such a scenario, the UE 100 determines that the gNB may be unable to decode the transmitted TB with or without the HARQ retransmissions and the HARQ combining techniques and no positive margin has been accumulated. Then, the UE 100 increases the transmission power to reach the gNB and sends the PHR by updating the power headroom such that the radiated exposure over an averaging window is within the regulatory limits. The UE 100 may receive the TPC corresponding to the PHR, then the UE 100 may transmit with reduced power to maintain an average. Once the user blockage has been released, the UE 100 may transmit using the previous transmission power.

With respect to FIG. 11C, the UE 100 encounters blockage/interaction/presence of the user and the UE 100 reduces the transmission power to meet the regulatory limits. Further, the UE 100 determines that the gNB may be unable to decode the transmitted TB with or without the HARQ retransmissions and the HARQ combining techniques, no positive margin has been accumulated, and the UE 100 in the negative margin. Further, the UE 100 has not received the TPC command based on the previously transmitted PHR. In such a scenario, the UE 100 may initiate the recovery procedure through the SRS transmission. The UE 100 selects the SRS ports, transmits the selects SRS ports to the gNB, and waits until the earliest SRS transmission to receive the SRI report from the gNB. If the received SRI is one among the transmitted SRS ports, the UE 100 transmits the UL signals using the received SRI beam/port.

Figure 11D:
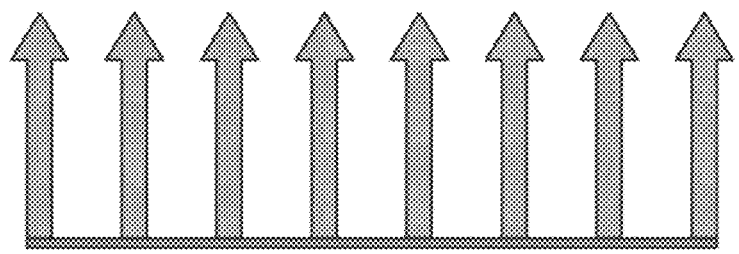

With respect to FIG. 11D, the UE 100 encounters the user blockage/interaction/presence of the user. Further, the UE 100 determines that the UE 100 is not required to reduce the transmission power to meet the regulatory limits. In such a scenario, the UE 100 may continue with the normal mode of operation.

With respect to FIG. 11E, the UE 100 encounters blockage/interaction/presence of the user and the UE 100 reduces the transmission power to meet the regulatory limits. In such a scenario, the UE 100 determines that the gNB may be unable to decode the transmitted TB with or without the HARQ retransmissions and the HARQ combining techniques and the positive margin has been accumulated. Then, the UE 100 may increase its transmission power using the positive margin accumulated to reach the gNB and updates the power headroom to inform the gNB that the UE 100 may be transmitting with less power for further transmissions such that the radiated exposure over the averaging window is in the regulatory limits.

Figure 11F:
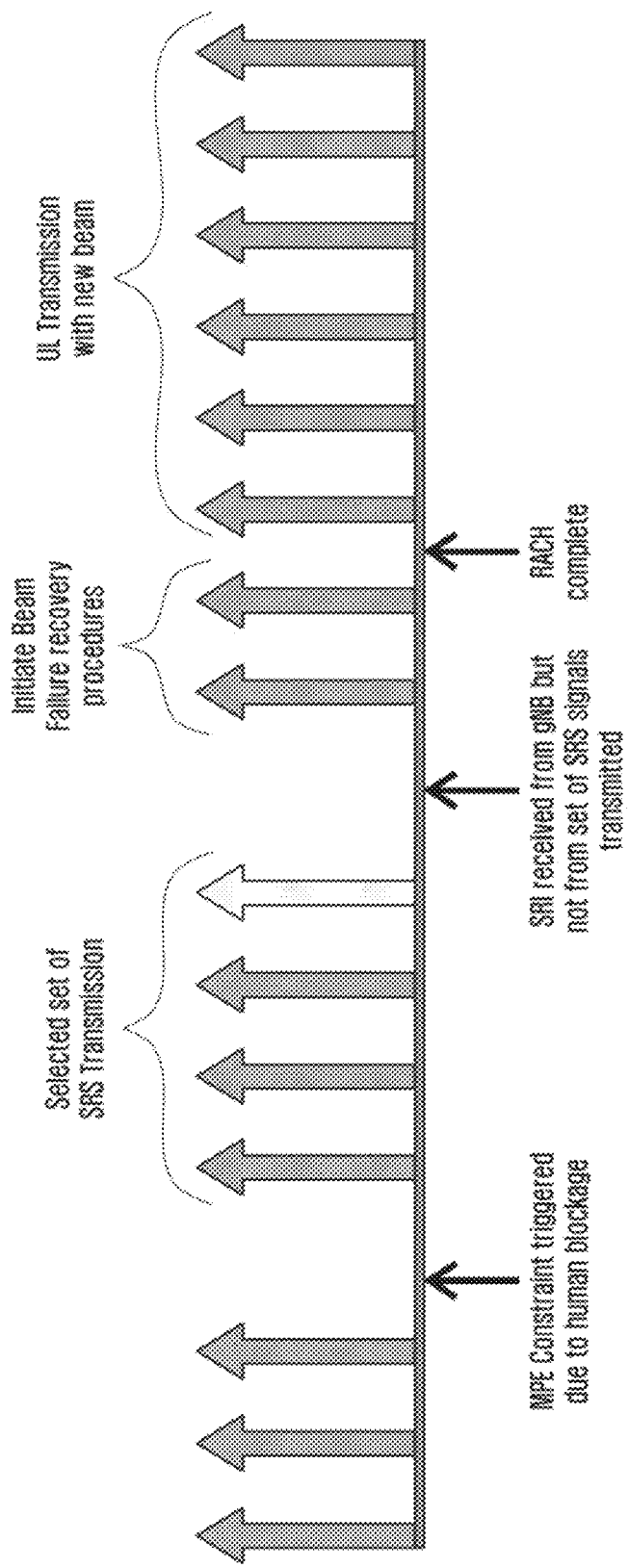

With respect to FIG. 11F, the UE 100 encounters blockage/interaction/presence of the user and the UE 100 reduces the transmission power to meet the regulatory limits. In such a scenario, the UE 100 determines that the gNB may be unable to decode the transmitted TB with or without the HARQ retransmissions and the HARQ combining techniques, no positive margin has been accumulated, and the UE 100 in the negative margin. Further, the UE 100 has not received the TPC command based on the previously transmitted PHR. In such a configuration, the UE 100 may initiate the recovery procedure through the SRS transmission. The UE 100 selects the SRS ports, transmits the selects SRS ports to the gNB, and waits until the earliest SRS transmission to receive the SRI report from the gNB. If the received SRI is not one among the transmitted SRS ports, the UE 100 may initiate the beam failure recovery procedures that enable the UE 100 to transmit the uplink signals with the identified new candidate beam.

Figure 12:
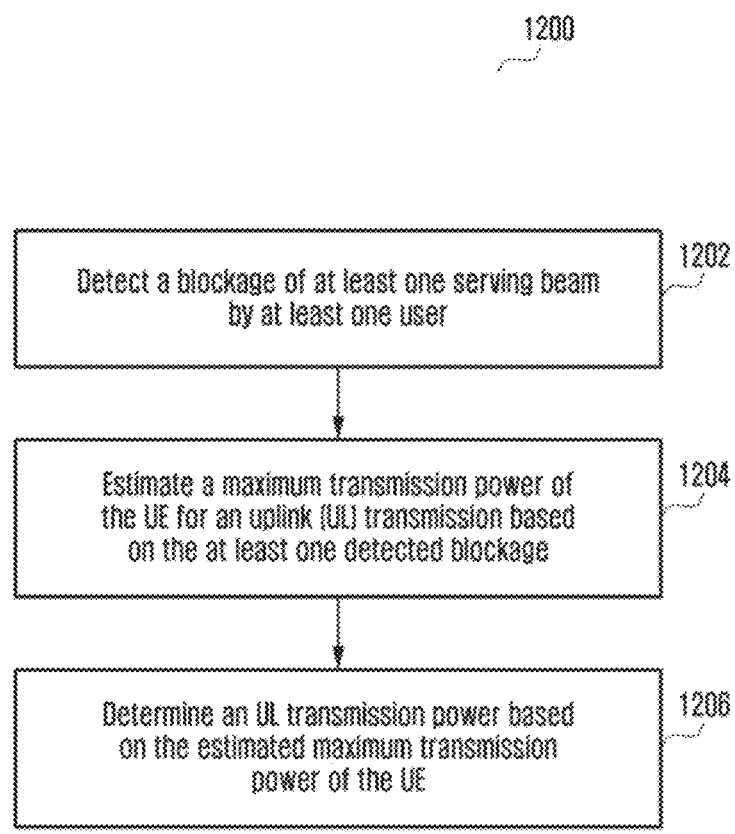
FIG. 12 is a flowchart illustrating a method of controlling the transmission power of the UE, according to an embodiment.

FIG. 12 is a flowchart illustrating a method 1200 of controlling the transmission power of the UE 100 in the beam-based communication based on the human interactions, according to an embodiment. At step 1202, the method includes detecting, by the processor 108, the blockage of at least one serving beam by at least one user using at least one sensor.

At step 1204, the method includes estimating, by the processor 108, the maximum transmission power of the UE for the UL transmission based on the at least one detected blockage.

At step 1206, the method includes determining, by the processor 108, the UL transmission power based on the estimated maximum transmission power of the UE.

The various actions in method 1200 may be performed in the order presented, in a different order or simultaneously. Further, in some embodiments, some actions listed in FIG. 12 may be omitted.

The embodiments disclosed herein can be implemented through at least one software program running on at least one hardware device and performing network management functions to control the elements. The elements shown in FIG. 1 and FIG. 2 can be at least one of a hardware device, or a combination of hardware device and software module.

The embodiments disclosed herein describe methods and systems for controlling transmission power of a User Equipment based on user interactions. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:

1. A method of controlling transmission power of a User Equipment (UE), the method comprising:
   detecting, by a processor, a blockage of at least one serving beam of the UE by at least one user;
   estimating, by the processor, a maximum transmission power of the UE for an uplink (UL) transmission based on the blockage;
   calculating a positive margin and a negative margin of maximum permissible exposure (MPE) and an uplink factor, wherein the positive margin and the negative margin depend on previous UL transmission powers by the UE and the uplink factor depends on an radio resource control (RRC) configuration;
   scaling the estimated maximum transmission power of the UE using the uplink factor and the negative margin, wherein scaling the estimated maximum transmission power includes increasing the estimated maximum transmission power by the uplink factor and multiplying the increased maximum transmission power using the negative margin;
comparing the scaled maximum transmission power of the UE with new radio (NR) power; and
using the NR power for the UL transmission if the calculated maximum transmission power is more than or equal to the NR power.

2. The method of claim 1, wherein the maximum transmission power of the UE is within regulatory limits including at least one of Specific Absorption Rate (SAR) requirements, maximum permissible exposure (MPE) requirements and link budget.

3. The method of claim 1, wherein the detecting comprises:
receiving sensor data from at least one sensor of the UE;
determining user related information based on the sensor data, wherein the user related information includes at least one of a presence of the at least one user, a distance of the at least one user from the UE, and a position of the at least one user relative to the UE;
determining beam-related information that includes orientation of the at least one serving beam and serving beam gain pattern; and
creating a virtual beam pattern using the user related information and the beam-related information to detect the blockage of the at least one serving beam by the at least one user.

4. The method of claim 3, wherein estimating comprises:
calculating the NR power and Long Term Evolution (LTE) power according to a mode of operation of the UE;
calculating an LTE SAR based on at least one of LTE power, a detection range of the at least one sensor, the virtual beam pattern, and the position of the at least one user blocking the at least one serving beam;
determining at least one of an NR SAR limit and an NR Power Density Limit (NR $PD_{limit}$) based on the calculated LTE SAR and the mode of operation of the UE; and
calculating the maximum transmission power of the UE corresponding to at least one of the NR SAR limit and NR $PD_{limit}$ based on at least one of the detection range of the at least one sensor, the virtual beam pattern, and the position of the at least one user blocking the at least one serving beam.

5. The method of claim 4, wherein the mode of operation includes at least one of an inter-band Evolved-Universal Terrestrial Radio Access-New Radio-Dual Connectivity (ENDC) within an FR1 band, an inter-band ENDC including an FR2 band, an inter-band ENDC including both the FR1 band and the FR2 band, an intra-band contiguous ENDC, an intra-band non-contiguous EN-DC, and an Inter-band New Radio Dual between the FR1 band and the FR2 band.

6. The method of claim 1, further comprising:
updating at least one of a power headroom and an allowed maximum power reduction metric.

7. The method of claim 6, further comprising:
determining if the UE is able to transmit with the scaled maximum transmission power and at least one Base Station (BS) is able to decode a Transport Block (TB) using Hybrid Automatic Repeat Request (HARQ) combination techniques without exceeding a maximum number of HARQ retransmissions if the scaled maximum transmission power of the UE is less than the NR power.

8. The method of claim 7, further comprising:
using the scaled maximum transmission power for the UL transmission and updating at least one of the power headroom and the allowed maximum power reduction metric, if the at least one BS is able to decode the TB using the HARQ combination techniques without exceeding the maximum number of HARQ retransmissions.

9. The method of claim 7, further comprising:
checking for accumulation of the positive margin over a time if the at least one BS is not able to decode the TB using the HARQ combination techniques without exceeding the maximum number of HARQ retransmission;
prioritizing at least one channel of the UL transmission when the at least one BS is not able to decode the TB using the HARQ combination techniques without exceeding the maximum number of HARQ retransmissions;
re-estimating the scaled maximum transmission power of the UE for the uplink transmission using the positive margin to transmit a prioritized at least one portion of the uplink transmission on detecting the accumulation of the positive margin; and
using the re-estimated scaled maximum transmission power for the UL transmission of the at least one channel and updating at least one of the power headroom and the allowed maximum power reduction metric.

10. The method of claim 9, further comprising:
checking if the UE neither has the negative margin nor the positive margin and the UL transmission has a prioritized channel; and
using the NR power for the uplink transmission of the prioritized channel and updating at least one of the power headroom and the allowed maximum power reduction metric.

11. A User Equipment (UE), the UE comprising:
a memory storing computer-readable instructions; and
a processor that when executing the computer-readable instructions is configured to:
detect a blockage of at least one serving beam of the UE by at least one user;
estimate a maximum transmission power of the UE for an uplink (UL) transmission based on the blockage;
calculate a positive margin and a negative margin of maximum permissible exposure (MPE) and an uplink factor, wherein the positive margin and the negative margin depend on previous UL transmission powers by the UE and the uplink factor depends on an radio resource control (RRC) configuration;
scale the estimated maximum transmission power of the UE using the uplink factor and the negative margin, wherein scaling the estimated maximum transmission power includes increasing the estimated maximum transmission power by the uplink factor and multiplying the increased maximum transmission power using the negative margin;
compare the scaled maximum transmission power of the UE with new radio (NR) power; and
use the NR power for the UL transmission if the calculated maximum transmission power is more than or equal to the NR power.

12. The UE of claim 11, wherein the maximum transmission power of the UE is within regulatory limits including at least one of Specific Absorption Rate (SAR) requirements, maximum permissible exposure (MPE) requirements and link budget.

13. The UE of claim 11, wherein the processor when executing the computer-readable instructions is further configured to:
receive sensor data from at least one sensor of the UE;
determine user related information based on the sensor data, wherein the user related information includes at least one of a presence of the at least one user, a distance of the at least one user from the UE, and a position of the at least one user relative to the UE;
determine beam-related information that includes orientation of the at least one serving beam and serving beam gain pattern; and
create a virtual beam pattern using the user related information and the beam-related information to detect the blockage of the at least one serving beam by the at least one user.

14. The UE of claim 13, wherein the processor when executing the computer-readable instructions is further configured to:
calculate the NR power, and Long Term Evolution (LTE) power according to a mode of operation of the UE;
calculate an LTE SAR based on at least one of the LTE power, a detection range of the at least one sensor, the virtual beam pattern, and the position of the at least one user blocking the at least one serving beam;
determine at least one of an NR SAR limit and an NR Power Density Limit (NR $PD_{limit}$) based on the calculated LTE SAR and the mode of operation of the UE; and
calculate the maximum transmission power of the UE corresponding to at least one of the NR SAR limit and NR $PD_{limit}$ based on at least one of the detection range of the at least one sensor, the virtual beam pattern and the position of the at least one user blocking the at least one serving beam.

15. The UE of claim 14, wherein the mode of operation includes at least one of an inter-band Evolved-Universal Terrestrial Radio Access-New Radio-Dual Connectivity (ENDC) within an FR1 band, an inter-band ENDC including an FR2 band, an inter-band ENDC including both the FR1 band and the FR2 band, an intra-band contiguous ENDC, an intra-band non-contiguous EN-DC, and an Inter-band New Radio Dual between the FR1 band and the FR2 band.

16. The UE of claim 14, wherein the processor when executing the computer-readable instructions is further configured to:
update at least one of a power headroom and an allowed maximum power reduction metric.

17. The UE of claim 16, wherein the processor when executing the computer-readable instructions is further configured to:
determine if the UE is able to transmit with the scaled maximum transmission power and at least one Base Station (BS) is able to decode a Transport Block (TB) using Hybrid Automatic Repeat Request (HARQ) combination techniques without exceeding a maximum number of HARQ retransmissions if the scaled maximum transmission power of the UE is less than the NR power.

18. The UE of claim 17, wherein the processor when executing the computer-readable instructions is further configured to:
use the scaled maximum transmission power for the UL transmission and update at least one of the power headroom and the allowed maximum power reduction metric, if the at least one BS is able to decode the TB using the HARQ combination techniques without exceeding the maximum number of HARQ retransmissions.

19. The UE of claim 17, wherein the processor when executing the computer-readable instructions is further configured to:
check for accumulation of the positive margin over a time if the at least one BS is not able to decode the TB using the HARQ combination techniques without exceeding the maximum number of HARQ retransmission;
prioritize at least one channel of the UL transmission when the at least one BS is not able to decode the TB using the HARQ combination techniques without exceeding the maximum number of HARQ retransmissions;
re-estimate the scaled maximum transmission power of the UE for the uplink transmission using the positive margin to transmit a prioritized at least one portion of the uplink transmission on detecting the accumulation of the positive margin; and
use the re-estimated scaled maximum transmission power for the UL transmission of the at least one channel and update at least one of the power headroom and the allowed maximum power reduction metric.

20. The UE of claim 19, wherein the processor when executing the computer-readable instructions is further configured to:
check if the UE neither has the negative margin nor the positive margin and the UL transmission has a prioritized channel; and
use the NR power for the uplink transmission of the prioritized channel and update at least one of the power headroom and the allowed maximum power reduction metric.

* * * * *